(12) United States Patent
Kim et al.

(10) Patent No.: US 11,856,380 B2
(45) Date of Patent: Dec. 26, 2023

(54) SOUND CONTROL SYSTEM, VEHICLE INCLUDING THE SAME, AND SOUND CONTROL METHOD

(71) Applicant: LG Display Co., Ltd., Seoul (KR)

(72) Inventors: Taehyung Kim, Paju-si (KR); Jeonggoo Kang, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 2 days.

(21) Appl. No.: 17/549,533

(22) Filed: Dec. 13, 2021

(65) Prior Publication Data

US 2022/0210558 A1     Jun. 30, 2022

(30) Foreign Application Priority Data

Dec. 31, 2020    (KR) .................. 10-2020-0190062

(51) Int. Cl.
  *H04R 3/12*       (2006.01)
  *H04R 1/40*       (2006.01)
  *H04R 3/00*       (2006.01)
  *H04R 17/00*      (2006.01)
  *H04R 1/02*       (2006.01)
  *B60R 11/02*      (2006.01)
  *B60R 11/00*      (2006.01)

(52) U.S. Cl.
  CPC ............. *H04R 3/12* (2013.01); *B60R 11/02* (2013.01); *B60R 11/0247* (2013.01); *H04R 1/025* (2013.01); *H04R 1/406* (2013.01); *H04R 3/005* (2013.01); *H04R 17/00* (2013.01); *B60R 2011/0028* (2013.01); *B60R 2011/0043* (2013.01); *H04R 2400/11* (2013.01); *H04R 2499/13* (2013.01)

(58) Field of Classification Search
  CPC .......... H04R 1/025; H04R 1/406; H04R 3/12; H04R 3/005; H04R 17/00; H04R 2400/11; H04R 2499/13; B60R 11/02; B60R 11/0247; B60R 2011/0028; B60R 2011/0043
  USPC ..................... 381/59, 86, 302, 389
  See application file for complete search history.

(56) References Cited

U.S. PATENT DOCUMENTS

| | | | |
|---|---|---|---|
| 2012/0263338 A1* | 10/2012 | Hori | H04R 3/02 381/398 |
| 2016/0173978 A1* | 6/2016 | Li | G10L 21/0364 381/92 |
| 2017/0034623 A1* | 2/2017 | Christoph | H04S 7/301 |
| 2018/0190282 A1* | 7/2018 | Mohammad | G10K 11/178 |
| 2020/0314555 A1* | 10/2020 | Pfaffinger | H04R 5/02 |

* cited by examiner

*Primary Examiner* — William A Jerez Lora
(74) *Attorney, Agent, or Firm* — Birch, Stewart, Kolasch & Birch, LLP

(57) ABSTRACT

A sound control system comprises a sound generating device disposed at a vehicle ceiling corresponding to a seat region of the vehicle and disposed at a sound space formed within the vehicle to correspond to the seat region, and a sound processing circuit for providing a vibration driving signal to the sound generating device, the sound generating device vibrates based on the vibration driving signal to vibrate a vibration region of the vehicle ceiling corresponding to the sound space to provide a sound to the sound space.

46 Claims, 24 Drawing Sheets

SOUND CONTROL SYSTEM, VEHICLE INCLUDING THE SAME, AND SOUND CONTROL METHOD

CROSS-REFERENCE TO RELATED APPLICATIONS

This application claims the priority benefit to Korean Patent Application No. 10-2020-0190062 filed in the Republic of Korea on Dec. 31, 2020, which is hereby incorporated by reference in its entirety and for all purposes as if fully set forth into the present application.

BACKGROUND

Technical Field

The present disclosure relates to a sound control system, a vehicle including the same, and a sound control method.

Discussion of the Related Art

As an audio video navigation (AVN) system included in vehicles advances, interest in sound control in vehicles is increasing. Particularly, research for adjusting a sound output through a speaker of a vehicle based on a position of the vehicle is being actively done.

Because a voice coil type loud speaker is used in vehicles (i.e., a voice coil type speaker is installed in vehicles), sound focusing technology has a problem where it is difficult to form an independent sound space in each seat of the vehicle.

A sound focusing algorithm for forming an independent sound space in each seat is a method of storing a value, designated based on an initial setting value, in a memory for each mode desired by a user and loading a value stored in the memory based on a given condition to control a sound, and due to this, it is difficult to control a sound in real time based on situations, which are variously changed in a vehicle, such as an action of a passenger. Therefore, sound focusing algorithms can be unable to provide an optimized sound to a user.

SUMMARY OF THE DISCLOSURE

Therefore, the inventors of the present disclosure have recognized problems and other limitations described above and have performed various experiments on a sound control system, a vehicle including the same, and a sound control method, which can form an independent sound space within a vehicle and can provide a sound and a stereo sound having enhanced sound quality.

Based on the various experiments, the inventors of the present disclosure have invented a sound control system, a vehicle including the same, and a sound control method, which can form an independent sound space in the vehicle and can provide a sound and a stereo sound having enhanced sound quality.

Accordingly, embodiments of the present disclosure are directed to providing a sound control system for vehicles, a vehicle including the same, and a sound control method for vehicles that substantially obviate one or more problems due to limitations and disadvantages of the related art.

An aspect of the present disclosure is directed to provide a vehicle in which an independent sound space is provided in the vehicle.

An aspect of the present disclosure is directed to provide a sound control system, a vehicle including the same, and a sound control method, which can form an independent sound space in the vehicle and can provide a stereo sound.

An aspect of the present disclosure is directed to provide a sound control system, a vehicle including the same, and a sound control method, which can minimize the adverse effect of noise and can provide a sound having enhanced sound quality.

Additional features and aspects will be set forth in part in the description that follows, and in part will become apparent from the description, or can be learned by practice of the inventive concepts provided herein. Other features and aspects of the inventive concepts can be realized and attained by the structure particularly pointed out in the written description, or derivable therefrom, and the claims hereof as well as the appended drawings.

To achieve these and other aspects of the inventive concepts, as embodied and broadly described herein, a sound control system comprises a sound generating device disposed at a vehicle ceiling corresponding to a seat region of the vehicle and disposed at a sound space formed within the vehicle to correspond to the seat region, and a sound processing circuit configured to provide a vibration driving signal to the sound generating device, the sound generating device is configured to vibrate based on the vibration driving signal to vibrate a vibration region of the vehicle ceiling corresponding to the sound space to provide a sound to the sound space.

In another aspect, a vehicle comprises a ceiling, an enclosure disposed at the ceiling corresponding to a seat region of the vehicle to form a sound space, and a sound control system configured to provide a sound to the sound space, the sound control system comprising a sound generating device disposed within the enclosure, and a sound processing circuit configured to provide a vibration driving signal to the sound generating device to cause the sound generating device to vibrate a vibration region of the vehicle ceiling corresponding to the sound space to provide a sound to the sound space.

In another aspect, a sound control method comprises generating a vibration driving signal based on a supplied sound source signal, and vibrating a sound generating device, based on the vibration driving signal, to vibrate a vibration region of a vehicle corresponding to a sound space of the vehicle to provide a sound to the sound space.

In another aspect, a sound control system comprises a sound generating device assembly disposed within a vehicle interior and including a plurality of sound generating devices, each sound generating device being disposed within a respective sound space of the vehicle interior, and a sound processing circuit configured to provide a vibration driving signal to the sound generating device assembly to cause each sound generating device to provide a sound to the respective sound space.

The sound control system and the vehicle including the same according to an embodiment of the present disclosure can form an independent sound space in the vehicle and can provide a stereo sound.

The sound control system and the vehicle including the same according to an embodiment of the present disclosure can minimize the adverse effect of noise and can provide a sound having good sound quality.

The sound control system and the vehicle including the same according to an embodiment of the present disclosure can reflect an in-vehicle situation in real time to provide a sound optimized for a current situation.

Other systems, methods, features and advantages will be, or will become, apparent to one with skill in the art upon examination of the following figures and detailed description. It is intended that all such additional systems, methods, features and advantages be included within this description, be within the scope of the present disclosure, and be protected by the following claims. Nothing in this section should be taken as a limitation on those claims. Further aspects and advantages are discussed below in conjunction with embodiments of the disclosure.

It is to be understood that both the foregoing general description and the following detailed description of the present disclosure are exemplary and explanatory and are intended to provide further explanation of the disclosure as claimed.

BRIEF DESCRIPTION OF THE DRAWINGS

The accompanying drawings, which are included to provide a further understanding of the present disclosure and are incorporated in and constitute a part of this application, illustrate embodiments of the disclosure and together with the description serve to explain the principle of the disclosure. However, the technical features of the present disclosure are not limited to specific drawings, and features disclosed in the drawings can be combined with each other to form a new embodiment.

Figure 1:
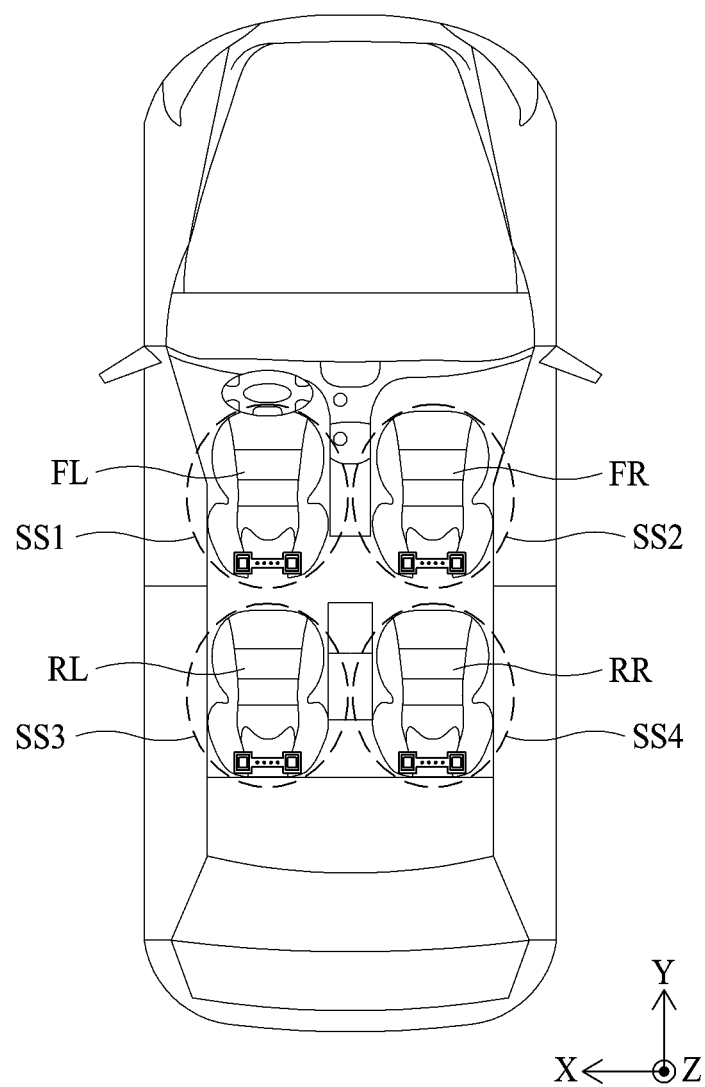
FIG. 1 illustrates a vehicle according to an embodiment of the present disclosure.

Throughout the drawings and the detailed description, unless otherwise described, the same drawing reference numerals should be understood to refer to the same elements, features, and structures. The relative size and depiction of these elements can be exaggerated for clarity, illustration, and convenience.

DETAILED DESCRIPTION OF THE EMBODIMENTS

Reference will now be made in detail to embodiments of the present disclosure, examples of which can be illustrated in the accompanying drawings. In the following description, when a detailed description of well-known functions or configurations related to this document is determined to unnecessarily cloud a gist of the inventive concept, the detailed description thereof will be omitted or may be briefly discussed. The progression of processing steps and/or operations described is an example; however, the sequence of steps and/or operations is not limited to that set forth herein and can be changed as is known in the art, with the exception of steps and/or operations necessarily occurring in a particular order. Like reference numerals designate like elements throughout. Names of the respective elements used in the following explanations are selected only for convenience of writing the specification and can be thus different from those used in actual products.

Advantages and features of the present disclosure, and implementation methods thereof will be clarified through following embodiments described with reference to the accompanying drawings. The present disclosure can, however, be embodied in different forms and should not be construed as limited to the embodiments set forth herein.

Rather, these embodiments are provided so that this disclosure will be thorough and complete, and will fully convey the scope of the present disclosure to those skilled in the art. Further, the present disclosure is only defined by scopes of claims.

A shape, a size, a ratio, an angle, and a number disclosed in the drawings for describing embodiments of the present disclosure are merely an example, and thus, the present disclosure is not limited to the illustrated details. Like reference numerals refer to like elements throughout. In the following description, when the detailed description of the relevant known function or configuration is determined to unnecessarily obscure the important point of the present disclosure, the detailed description will be omitted or may be briefly discussed. When "comprise," "have," and "include" described in the present specification are used, another part can be added unless "only" is used. The terms of a singular form can include plural forms unless referred to the contrary.

In construing an element, the element is construed as including an error or tolerance range although there is no explicit description of such an error or tolerance range.

In describing a position relationship, for example, when a position relation between two parts is described as, for example, "on," "over," "under," and "next," one or more other parts can be disposed between the two parts unless a more limiting term, such as "just" or "direct(ly)" is used.

In describing a time relationship, for example, when the temporal order is described as, for example, "after," "subsequent," "next," and "before," a case that is not continuous can be included unless a more limiting term, such as "just," "immediate(ly)," or "direct(ly)" is used.

It will be understood that, although the terms "first," "second," etc. can be used herein to describe various elements, these elements should not be limited by these terms. These terms are only used to distinguish one element from another. For example, a first element could be termed a second element, and, similarly, a second element could be termed a first element, without departing from the scope of the present disclosure.

In describing elements of the present disclosure, the terms "first," "second," "A," "B," "(a)," "(b)," etc. can be used. These terms are intended to identify the corresponding elements from the other elements, and basis, order, or number of the corresponding elements should not be limited by these terms. The expression that an element is "connected," "coupled," or "adhered" to another element or layer the element or layer can not only be directly connected or adhered to another element or layer, but also be indirectly connected or adhered to another element or layer with one or more intervening elements or layers "disposed," or "interposed" between the elements or layers, unless otherwise specified.

In the description of embodiments, when a structure is described as being positioned "on, over, or above" or "under or below" another structure, this description should be construed as including a case in which the structures contact each other as well as a case in which a third structure is disposed therebetween. The size and thickness of each element shown in the drawings are given merely for the convenience of description, and are not limited thereto, unless otherwise specified.

The term "at least one" should be understood as including any and all combinations of one or more of the associated listed items. For example, the meaning of "at least one of a first item, a second item, and a third item" denotes the combination of all items proposed from two or more of the first item, the second item, and the third item as well as the first item, the second item, or the third item.

Features of various embodiments of the present disclosure can be partially or overall coupled to or combined with each other, and can be variously inter-operated with each other and driven technically as those skilled in the art can sufficiently understand. Embodiments of the present disclosure can be carried out independently from each other, or can be carried out together in co-dependent relationship.

Hereinafter, a sound control system for vehicles, a vehicle including the same, and a sound control method for vehicles according to embodiments of the present disclosure will be described in detail with reference to the accompanying drawings. All the components of each sound control system for vehicles as well as each vehicle including the same are operatively coupled and configured. Further, a scale of each of elements illustrated in the accompanying drawings differs from a real scale, and thus, is not limited to a scale illustrated in the drawings. In adding reference numerals to elements of each of the drawings, although the same elements are illustrated in other drawings, like reference numerals can refer to like elements.

Figure 2:
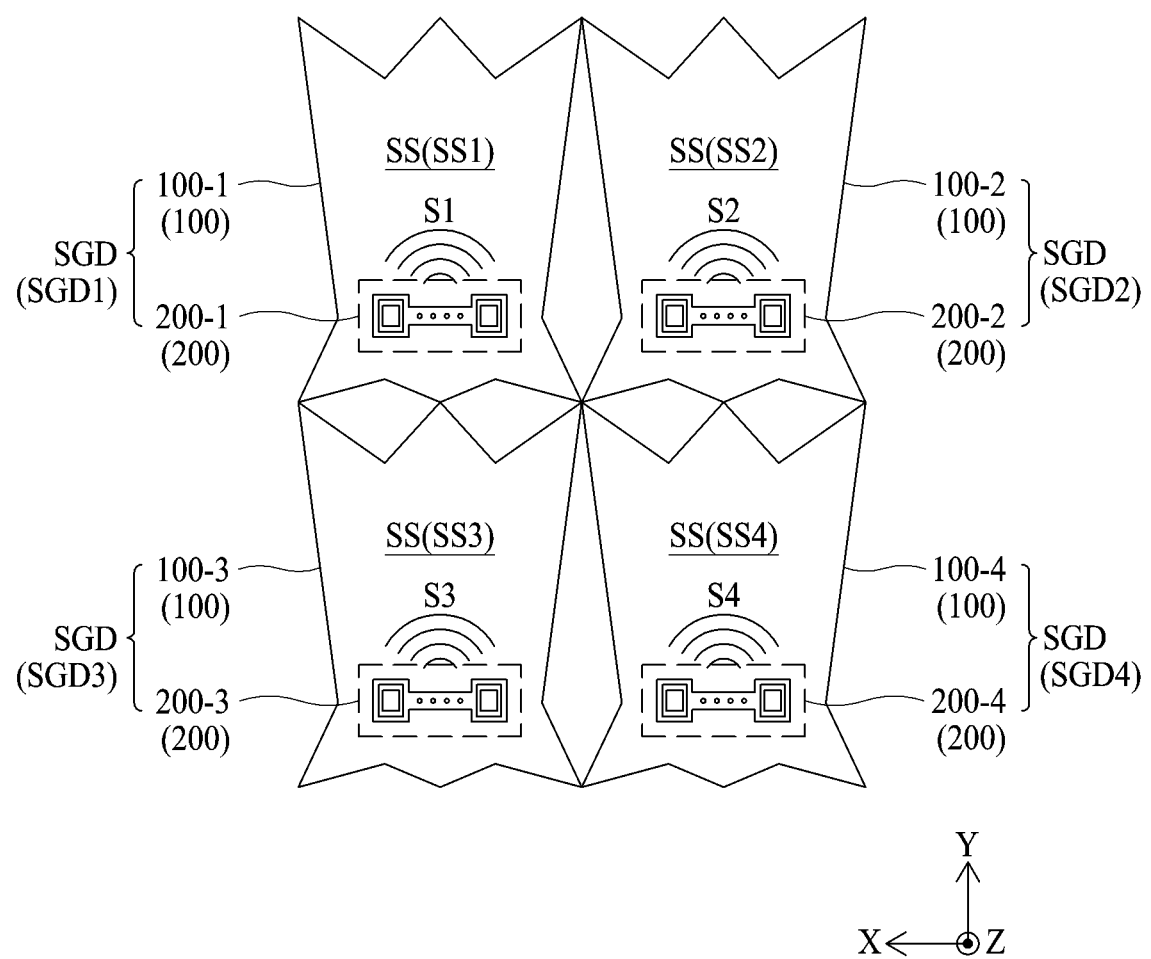
FIG. 2 illustrates a sound generating apparatus disposed at a vehicle according to an embodiment of the present disclosure.
Figure 3:
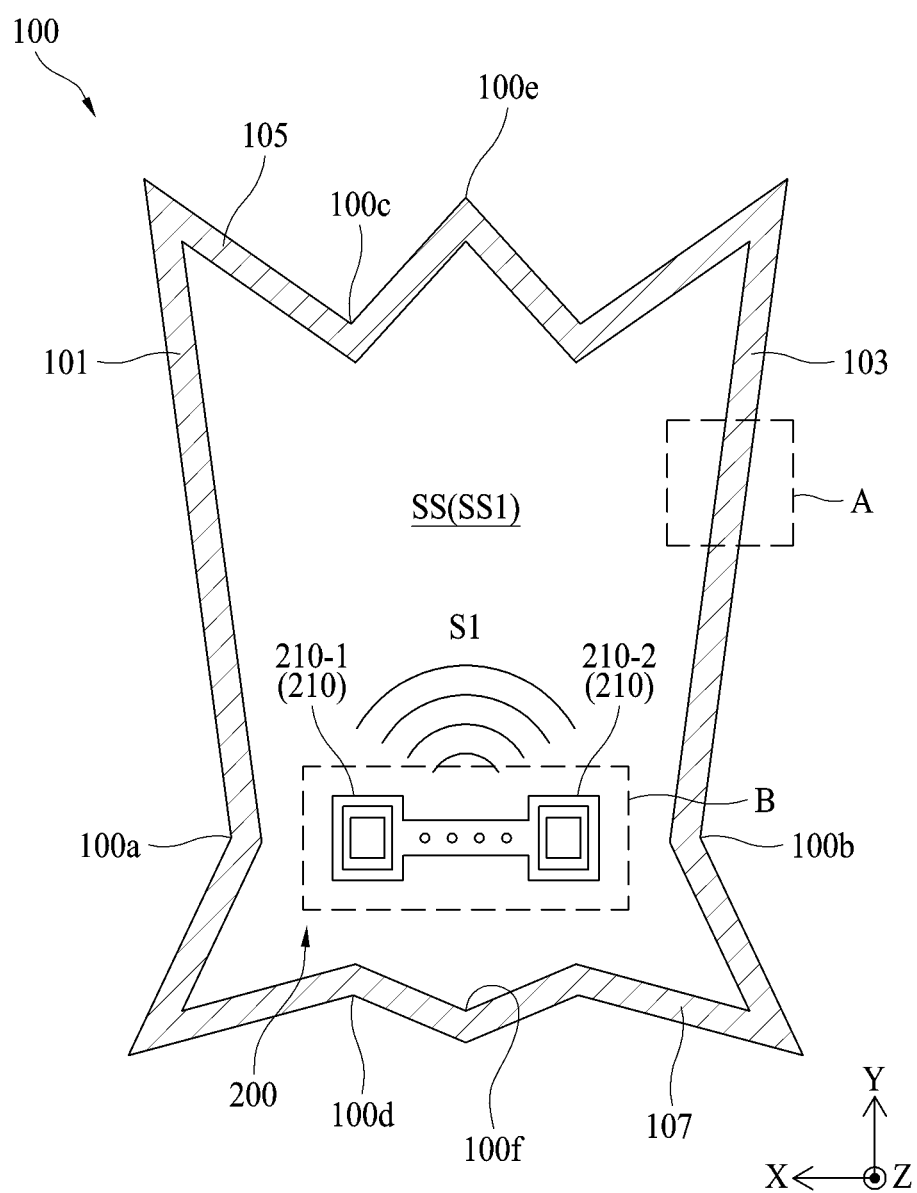
FIG. 3 illustrates a sound generating apparatus disposed at a vehicle according to an embodiment of the present disclosure.

FIG. 1 illustrates a vehicle according to an embodiment of the present disclosure. FIG. 2 illustrates a sound generating apparatus disposed at a vehicle according to an embodiment of the present disclosure. FIG. 3 illustrates a sound generating apparatus disposed at a vehicle according to an embodiment of the present disclosure.

With reference to FIGS. 1 and 2, the vehicle according to an embodiment of the present disclosure can include a sound control system including a sound generating apparatus SGD.

The sound generating apparatus SGD can be disposed in the vehicle. For example, the sound generating apparatus SGD can be disposed within a ceiling of the vehicle, but may be alternatively placed at any position on the vehicle, such as the vehicle floor, the vehicle trunk/boot, the vehicle truck bed, and the like. For example, the sound generating apparatus SGD can form an independent sound space SS in each seat and can provide an independent sound to the independent sound space SS. The sound space SS can be a space to which a sound provided to a passenger of the vehicle is propagated, and a plurality of sound generating apparatuses SGD can be disposed at the vehicle, so as to configure or divide an inner space of the vehicle into a plurality of sound spaces SS.

According to an embodiment of the present disclosure, the sound generating apparatus SGD can be disposed at the ceiling of the vehicle to correspond to each of a front left region (or a driver region) FL, a front right region (or a passenger region) FR, a rear left region RL, and a rear right region RR. A sound generating apparatus SGD disposed to correspond to the front left region FL can be a first sound generating apparatus SGD1, a sound generating apparatus SGD disposed to correspond to the front right region FR can be a second sound generating apparatus SGD2, a sound generating apparatus SGD disposed to correspond to the rear left region RL can be a third sound generating apparatus SGD3, and a sound generating apparatus SGD disposed to correspond to the rear right region RR can be a fourth sound generating apparatus SGD4.

According to an embodiment of the present disclosure, the first sound generating apparatus SGD1 can form a first sound space SS1 to correspond to the front left region (or driver region) FL and can provide a first sound S1 to the first sound space SS1. For example, the second sound generating apparatus SGD2 can form a second sound space SS2 to correspond to the front right region (or passenger region) FR and can provide a second sound S2 to the second sound space SS2. For example, the third sound generating apparatus SGD3 can form a third sound space SS3 to correspond to the rear left region RL and can provide a third sound S3 to the third sound space SS3. For example, the fourth sound generating apparatus SGD4 can form a fourth sound space SS4 to correspond to the rear right region RR and can provide a fourth sound S4 to the fourth sound space SS4.

The sound generating apparatus GSD can include an enclosure 100 and a sound generating device 200. For example, the first sound generating apparatus SGD1 can include a first enclosure 100-1 and a first sound generating device 200-1. For example, the second sound generating apparatus SGD2 can include a second enclosure 100-2 and a second sound generating device 200-2. For example, the third sound generating apparatus SGD3 can include a third enclosure 100-3 and a third sound generating device 200-3. For example, the fourth sound generating apparatus SGD4 can include a fourth enclosure 100-4 and a fourth sound generating device 200-4. For example, the sound generating devices can be referred to as sound vibrating devices or the like, but embodiments of present disclosure are not limited thereto.

The enclosure 100 can form an independent sound space and can be disposed at a ceiling of a vehicle. The enclosure 100 can be a structure material which spatially separates a sound in an inner space of the vehicle and configures the independent sound space. For example, the first enclosure 100-1 can be disposed at the ceiling of the vehicle to correspond to the front left region FL and can form the first sound space SS1. For example, the second enclosure 100-2 can be disposed at the ceiling of the vehicle to correspond to the front right region FR and can form the second sound space SS2. For example, the third enclosure 100-3 can be disposed at the ceiling of the vehicle to correspond to the rear left region RL and can form the third sound space SS3. For example, the fourth enclosure 100-4 can be disposed at the ceiling of the vehicle to correspond to the rear right region RR and can form the fourth sound space SS4.

In the following description, unless a case where the first to fourth enclosures 100-1, 100-2, 100-3, and 100-4 are differentiated from one another is described, a description of the enclosure 100 can be identically applied to each of the first to fourth enclosures 100-1, 100-2, 100-3, and 100-4.

With reference to FIG. 3, the enclosure 100 according to an embodiment of the present disclosure can include at least one or more bent portions 100a to 100f.

According to an embodiment of the present disclosure, the at least one or more bent portions 100a to 100f may be toward (e.g., may face toward) an inner portion of the enclosure 100, or may be toward an outer portion of the enclosure 100. For example, the at least one or more bent portions 100a to 100f can face the sound generating device 200 disposed at the enclosure 100 (or a sound space). For example, the at least one or more bent portions 100a to 100f can face the sound generating device 200 and may be toward the sound generating device 200 or may be toward an opposite direction of the sound generating device 200. For example, the at least one or more bent portions 100a to 100d can face a vibration generator 210 of the sound generating device 200 and may be toward the vibration generator 210 or may be toward an opposite direction of the vibration generator 210. For example, the at least one or more bent portions 100a-f can face a microphone array 220 of the sound generating device 200 and may be toward the microphone array 220 or may be toward an opposite direction of the microphone array 220.

According to an embodiment of the present disclosure, the enclosure 100 can include at least one or more pair of bent portions (100a, 100b) (100c, 100d), and (100e, 1000 facing one another.

According to an embodiment of the present disclosure, the at least one or more pair of bent portions (100a, 100b), (100c, 100d), and (100e, 1000 may be toward the inner portion of the enclosure 100, or may be toward the outer portion of the enclosure 100. For example, the at least one or more pair of bent portions (100a, 100b) (100c, 100d), and (100e, 1000 can face one another with the sound generating device 200 therebetween and may be toward the sound generating device 200 or may be toward an opposite direction of the sound generating device 200. For example, the at least one or more pair of bent portions (100a, 100b) and (100c, 100d) can face one another with the vibration generator 210 of the sound generating device 200 therebetween and may be toward the vibration generator 210 or may be toward the opposite direction of the vibration generator 210. For example, the at least one or more pair of bent portions (100e, 1000 can face one another with the microphone array 220 of the sound generating device 200 and may be toward the microphone array 220 or may be toward the opposite direction of the microphone array 220.

According to an embodiment of the present disclosure, the enclosure 100 can include a pair of first sides 101 and 103, which are disposed at a first direction (or a lengthwise direction) Y of the vehicle and face each other with the sound generating device 200 therebetween, and a pair of second sides 105 and 107 which are disposed at a second direction (or a widthwise direction) X of the vehicle and face each other with the sound generating device 200 therebetween. For example, the pair of first sides 101 and 103 can include a 1-$1^{st}$ side 101 and a 1-$2^{nd}$ side 103, and the pair of second sides 105 and 107 can include a 2-$1^{st}$ side 105 and a 2-$2^{nd}$ side 107. For example, the pair of first sides 101 and 103 can be connected to the pair of second sides 105 and 107, and thus, the sound space SS can be formed.

According to an embodiment of the present disclosure, the bent portions 100a and 100b can be formed at the 1-$1^{st}$ side 101 or the 1-$2^{nd}$ side 103 of the pair of first sides 101 and 103. For example, the bent portions 100a and 100b can be formed at each of the pair of first sides 101 and 103. For example, the bent portions 100c to 100f can be formed at the 2-$1^{st}$ side 105 or the 2-$2^{nd}$ side 107 of the pair of second sides 105 and 107. For example, the bent portions 100c and 100e can be formed at the 2-$1^{st}$ side 105 of the pair of second sides 105 and 107, and the bent portions 100d and 100f can be formed at the 2-$2^{nd}$ side 107 of the pair of second sides 105 and 107.

According to an embodiment of the present disclosure, the bent portions (100a, 100b) can be formed at each of the pair of first sides 101 and 103 to face each other. For example, the bent portions (100a, 100b) can be formed at each of the pair of first sides 101 and 103 to face each other with the sound generating device 200 therebetween. For example, the bent portions (110c, 100e) and (100d, 1000 can be formed at each of the pair of second sides 105 and 107 to face each other. For example, the bent portions (110c, 100e) and (100d, 1000 can be formed at each of the pair of second sides 105 and 107 to face each other with the sound generating device 200 therebetween. For example, the bent portions (100c, 100d) can be formed at each of the pair of second sides 105 and 107 to face each other with the vibration generator 210 of the sound generating device 200 therebetween. For example, the bent portions (100e, 1000 can be formed at each of the pair of second sides 105 and 107 to face each other with the microphone array 220 of the sound generating device 200 therebetween.

The enclosure 100 can be formed in a shape configured to implement the optimization of a sound field and the optimization of a sound characteristic. For example, the enclosure 100 can be formed in a circular shape, an oval shape, or a polygonal shape, and a shape of the enclosure 100 is not limited thereto. For example, the first to fourth enclosures 100-1 to 100-4 can have the same shape, or can have different shapes.

Figure 4A:
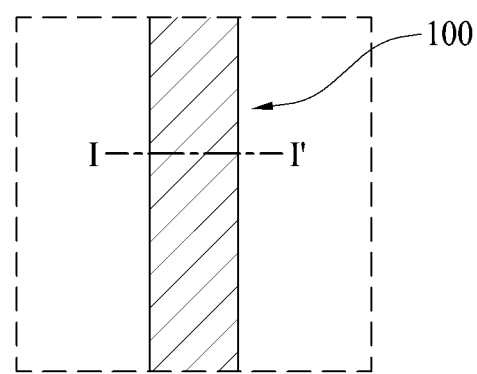
FIG. 4A is an enlarged view of a region 'A' illustrated in FIG. 3.
Figure 4B:
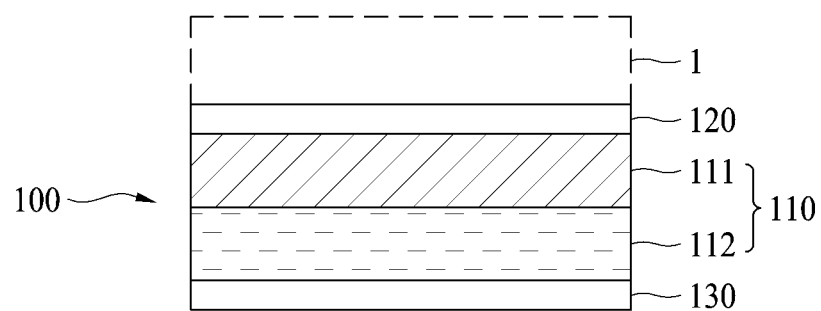
FIG. 4B is a cross-sectional view line I-I' illustrated in FIG. 4A.

FIG. 4A is an enlarged view of a region 'A' illustrated in FIG. 3. FIG. 4B is a cross-sectional view line I-I' illustrated in FIG. 4A.

With reference to FIGS. 4A and 4B, the enclosure 100 according to an embodiment of the present disclosure can be disposed at a vehicle ceiling 1 and can include a vibration absorption member 110. For example, the vibration absorption member 110 can absorb a wave (e.g., a sound wave or a vibration wave) at a corner of the enclosure 100, thereby minimizing reflection. For example, the vibration absorption member 110 can include a high-density/damping material, such as rubber or silicon suitable for vibration attenuation, or a porous material (e.g., polyurethane) suitable for sound absorption, or the like, but embodiments of the present disclosure are not limited thereto.

According to an embodiment of the present disclosure, the vibration absorption member 110 can be formed of a single layer or a multilayer. For example, the vibration absorption member 110 can include a first vibration absorption layer 111 which is formed of a high-density/damping material such as rubber or silicon suitable for vibration attenuation. For example, the vibration absorption member 110 can include a second vibration absorption layer 112 which is formed of a porous material (e.g., polyurethane) suitable for sound absorption. For example, the vibration absorption member 110 can include the first vibration absorption layer 111 and the second vibration absorption layer 112. For example, the first vibration absorption layer 111 can be disposed at a vehicle ceiling, and the second vibration absorption layer 112 can be disposed at a rear surface of the first vibration absorption layer 111. For example, the second vibration absorption layer 112 can be disposed at the vehicle ceiling, and the first vibration absorption layer 111 can be disposed at a rear surface of the second vibration absorption layer 112.

According to an embodiment of the present disclosure, the enclosure 100 can include an adhesive member (or a first adhesive member) 120 disposed at an upper surface (or one surface or one side surface) of the vibration absorption member 110. For example, the vibration absorption member 110 can be disposed at a vehicle ceiling 1 by the first adhesive member 120. For example, the first adhesive member 120 can be disposed between the vehicle ceiling 1 and the vibration absorption member 110.

According to an embodiment of the present disclosure, the enclosure 100 can include a protection member (or a first protection member) 130 disposed at a lower surface (or the other surface or the other side surface) of the vibration absorption member 110. For example, the first protection member 130 can cover the vibration absorption member 110 and can minimize or prevent the damage of the vibration absorption member 110 caused by an external impact. Because the damage of the vibration absorption member 110 is prevented by the first protection member 130, a reduction in a vibration absorption characteristic of the vibration absorption member 110 can be minimized or prevented.

Figure 5A:
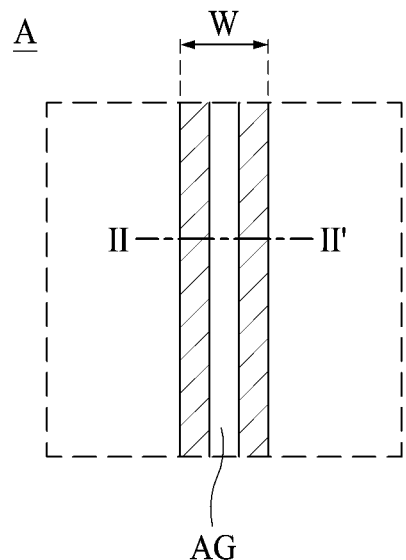
FIG. 5A is another enlarged view of the region 'A' illustrated in FIG. 3.
Figure 5B:
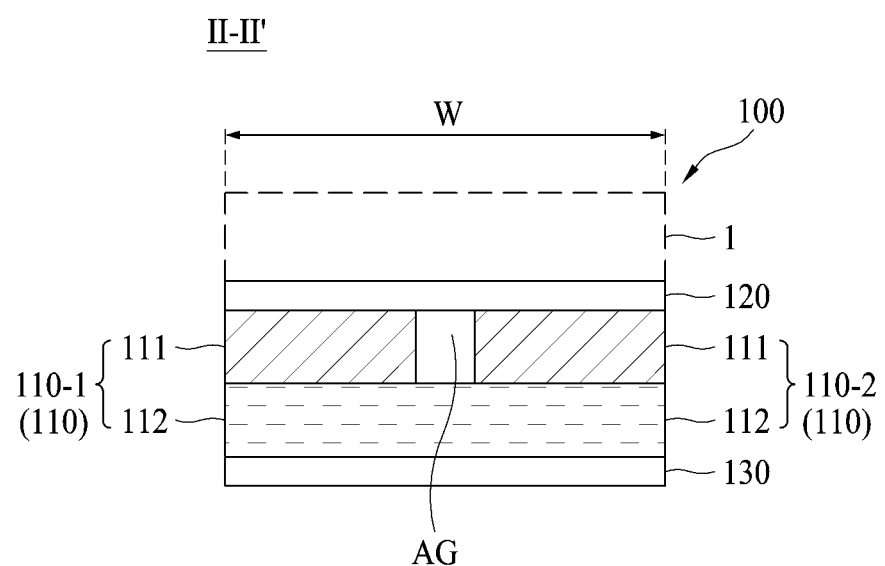
FIG. 5B is a cross-sectional view line II-II' illustrated in FIG. 5A.

FIG. 5A is another enlarged view of the region 'A' illustrated in FIG. 3. FIG. 5B is a cross-sectional view line II-IF illustrated in FIG. 5A.

FIG. 5A illustrates an embodiment implemented by modifying the vibration absorption member 110 of the enclosure 100 of FIG. 4A. Hereinafter, repeated descriptions of the same elements other than a modified element and elements relevant thereto will be briefly given or are omitted.

With reference to FIGS. 5A and 5B, the enclosure 100 according to an embodiment of the present disclosure can further include an air gap AG. For example, the air gap AG can be formed at a center region of a width W of the enclosure 100. For example, the air gap AG can be formed at a center region of a width W of the vibration absorption member 110. For example, the enclosure 100 (or the width W of the vibration absorption member 110) can correspond to a width direction X of a vehicle. For example, the air gap AG can be formed at the first vibration absorption layer 111. For example, the air gap AG can be formed at the second vibration absorption layer 112. For example, the air gap AG can be formed at the first vibration absorption layer 111 and the second vibration absorption layer 112. For example, the enclosure 100 can prevent a diffraction of a sound wave (e.g., a wave or a vibration wave) and can form a back cavity, thereby enhancing a sound characteristic.

According to an embodiment of the present disclosure, the vibration absorption member 110 can be divided with the air gap AG therebetween. For example, the vibration absorption member 110 can include a first vibration absorption member 110-1 disposed at one side (or a portion) of the air gap AG and a second vibration absorption member 110-2 disposed at the other side of the air gap AG. For example, the first vibration absorption member 110-1 and the second vibration absorption member 110-2 can be spaced apart from each other in a width W direction of the enclosure 100, and a space formed by separation between the first vibration absorption member 110-1 and the second vibration absorption member 110-2 can be an air gap AG.

According to an embodiment of the present disclosure, the first adhesive member 120 can cover an upper surface of the first vibration absorption member 110-1, an upper surface of the second vibration absorption member 110-2, and an upper surface of the air gap AG. For example, the first protection member 130 can cover a lower surface of the first vibration absorption member 110-1, a lower surface of the second vibration absorption member 110-2, and a lower surface of the air gap AG.

With reference to FIGS. 1 to 3, the sound generating device 200 according to an embodiment of the present disclosure can be disposed at an area formed by the enclosure 100. For example, the sound generating device 200 can be disposed at the sound space SS of the enclosure 100 and can vibrate a vehicle vibration region (e.g., a vibration region) corresponding to the sound space SS to provide a sound S to the sound space SS. For example, the sound generating device 200 can be disposed at a vehicle ceiling. For example, the sound generating device 200 can be disposed between an interior material and a frame of the vehicle ceiling. For example, the sound generating device 200 can be provided in singular or in plurality at the sound space SS within the enclosure 100.

The sound generating device 200 according to an embodiment of the present disclosure can include first to fourth sound generating devices 200-1, 200-2, 200-3, and 200-4.

According to an embodiment of the present disclosure, the first sound generating device 200-1 can be disposed at a first sound space SS1 within the first enclosure 100-1 and can vibrate a first vehicle vibration region (e.g., a first vibration region) corresponding to the first sound space SS1 to provide a first sound S1 to the first sound space SS1. For example, the second sound generating device 200-2 can be disposed at a second sound space SS2 within the second enclosure 100-2 and can vibrate a second vehicle vibration region (e.g., a second vibration region) corresponding to the second sound space SS2 to provide a second sound S2 to the second sound space SS2.

According to an embodiment of the present disclosure, the third sound generating device 200-3 can be disposed at a third sound space SS3 within the third enclosure 100-3 and can vibrate a third vehicle vibration region (e.g., a third vibration region) corresponding to the third sound space SS3 to provide a third sound S3 to the third sound space SS3. For example, the fourth sound generating device 200-4 can be disposed at a fourth sound space SS4 within the fourth enclosure 100-4 and can vibrate a fourth vehicle vibration region (e.g., a fourth vibration region) corresponding to the fourth sound space SS4 to provide a fourth sound S4 to the fourth sound space SS4.

According to an embodiment of the present disclosure, each of the first to fourth sound generating devices 200-1, 200-2, 200-3, and 200-4 can be disposed as one or in plurality at the corresponding sound space of the first to fourth sound spaces SS1 to SS4.

In the following description, unless a case where the first to fourth sound generating devices 200-1, 200-2, 200-3, and 200-4 are differentiated from one another is described, a description of the sound generating device 200 can be identically applied to each of the first to fourth sound generating devices 200-1, 200-2, 200-3, and 200-4.

Figure 6:
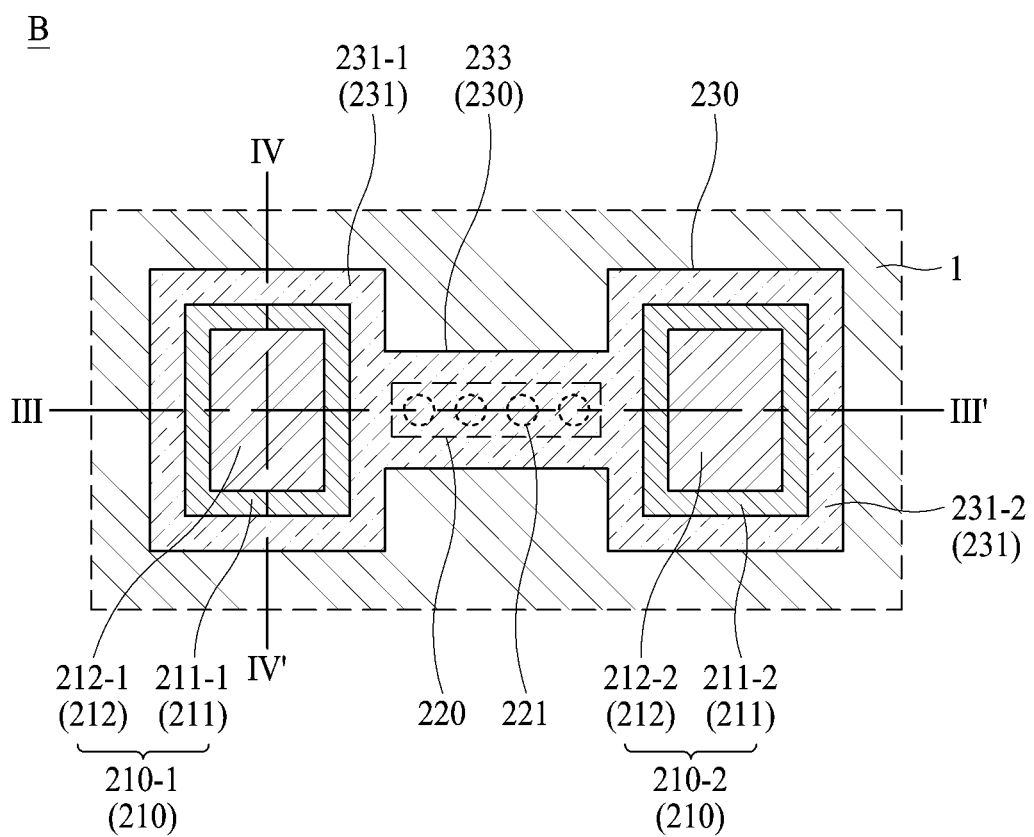
FIG. 6 is an enlarged view of a region 'B' illustrated in FIG. 3.
Figure 7:
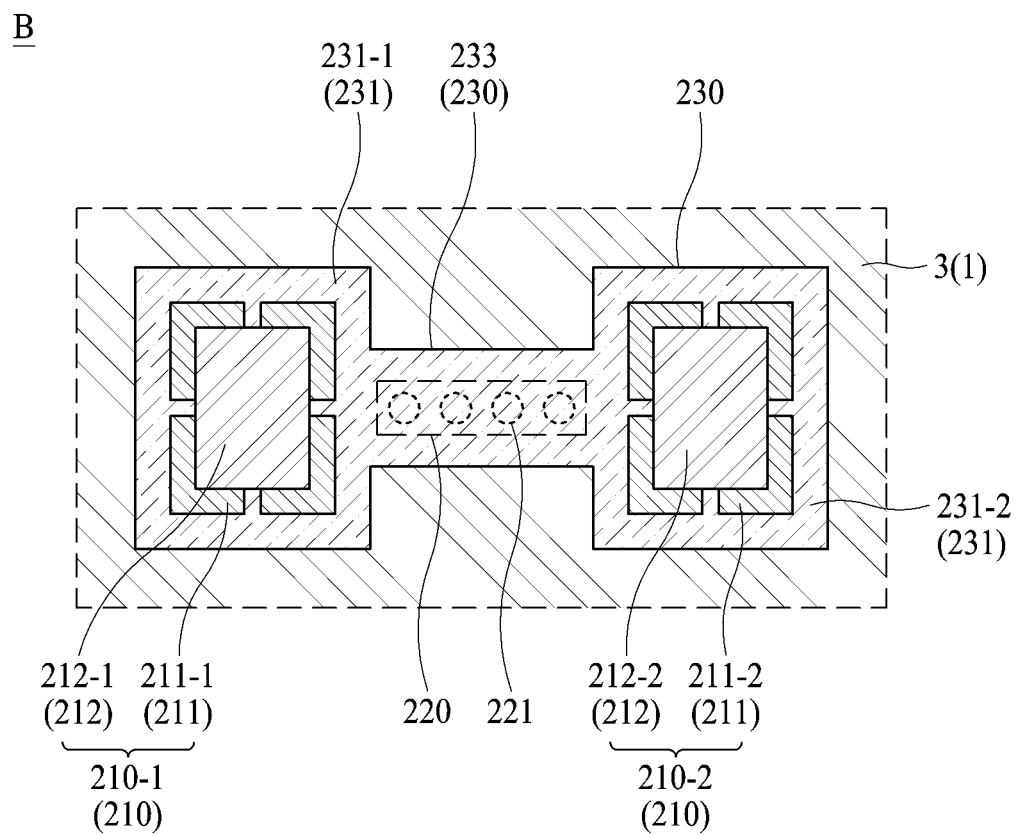
FIG. 7 is another enlarged view of the region 'B' illustrated in FIG. 3.
Figure 8:
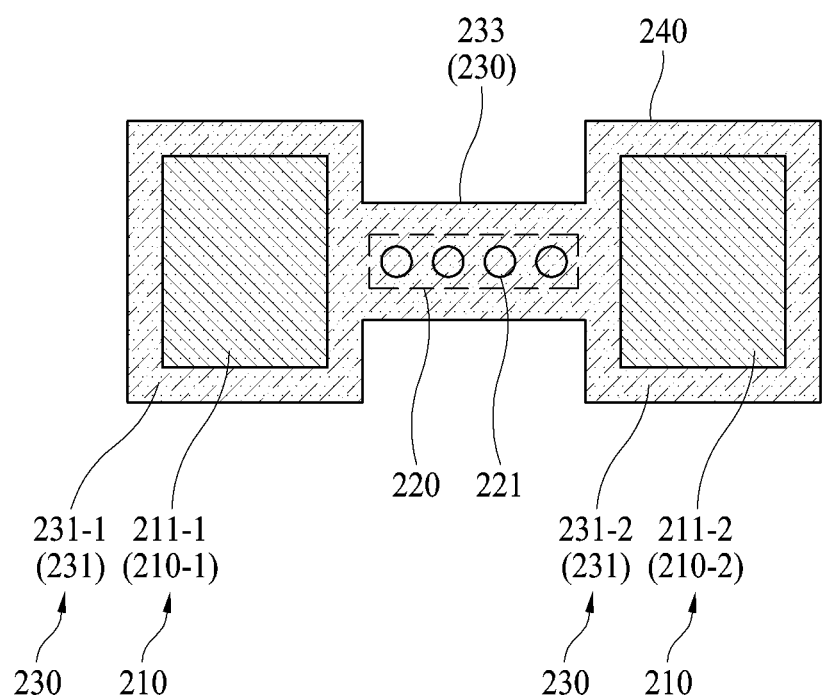
FIG. 8 is a rear view of a sound generating device illustrated in FIG. 6.
Figure 9:
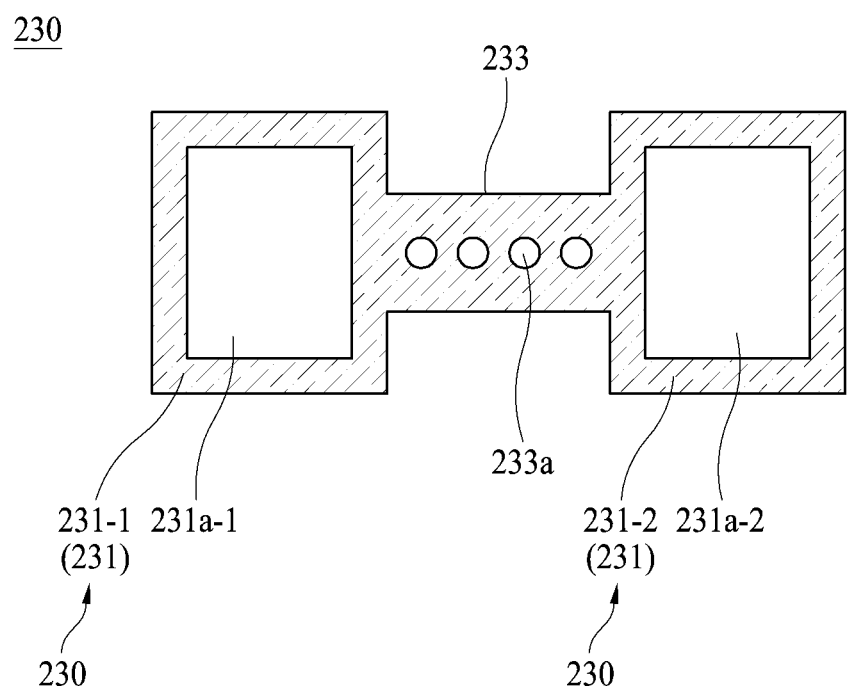
FIG. 9 illustrates a frame of a sound generating device illustrated in FIG. 6.
Figure 10:
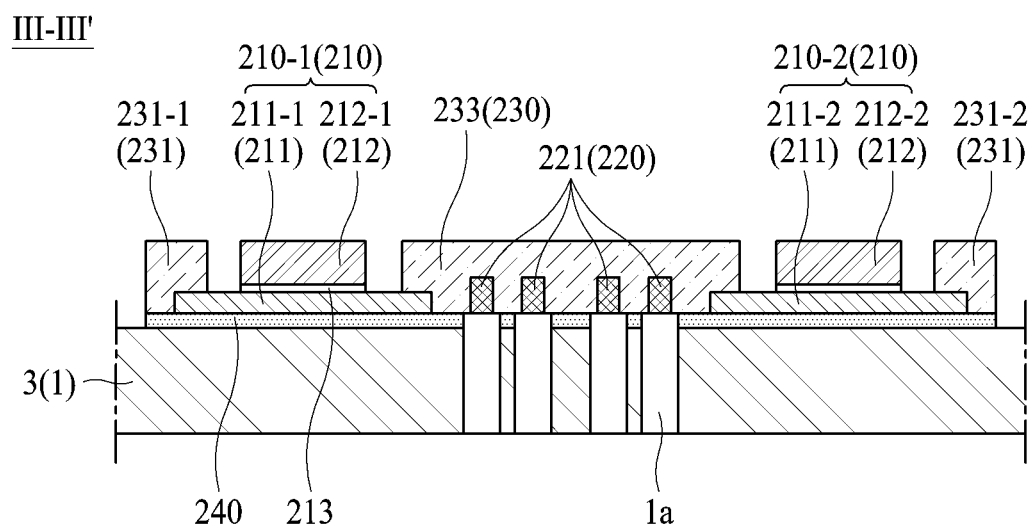
FIG. 10 is a cross-sectional view line illustrated in FIG. 6.
Figure 11:
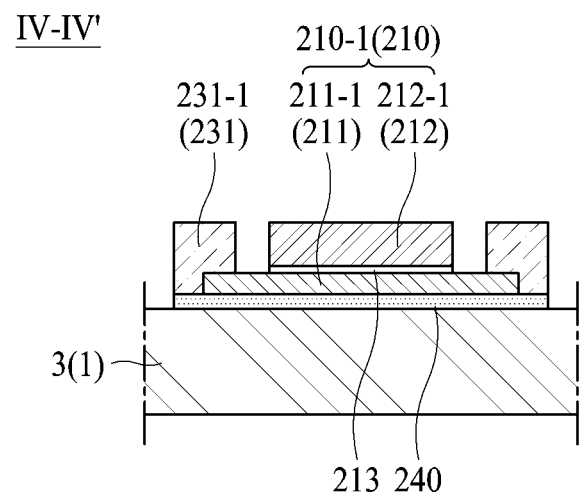
FIG. 11 is a cross-sectional view line IV-IV' illustrated in FIG. 6.

FIG. 6 is an enlarged view of a region 'B' illustrated in FIG. 3. FIG. 7 is another enlarged view of the region B illustrated in FIG. 3. FIG. 8 is a rear view of the sound generating device illustrated in FIG. 6. FIG. 9 illustrates a frame of the sound generating device illustrated in FIG. 6. FIG. 10 is a cross-sectional view line illustrated in FIG. 6. FIG. 11 is a cross-sectional view line IV-IV' illustrated in FIG. 6.

With reference to FIGS. 3 and 6 to 11, the sound generating device 200 according to an embodiment of the present disclosure can include a vibration generator 210 and a microphone array 220.

The sound generator 210 according to an embodiment of the present disclosure can vibrate a region of a vehicle (or a vibration region), corresponding to a sound space SS where the sound generating device 200 is disposed, to generate a sound S and can provide the sound S to a sound space SS.

According to an embodiment of the present disclosure, the sound generating device 200 can include one or more vibration generators 210. For example, the sound generating device 200 can include two vibration generators 210, but is not limited thereto. For example, the sound generating device 200 can include a first vibration generator 210-1 and a second vibration generator 210-2.

According to an embodiment of the present disclosure, the first vibration generator 210-1 and the second vibration generator 210-2 can be spaced apart from each other by a certain interval in a width direction X of the vehicle, but embodiments of the present disclosure are not limited thereto. For example, a microphone array 220 can be disposed between the first vibration generator 210-1 and the second vibration generator 210-2, but embodiments of the present disclosure are not limited thereto. For example, the vibration generator 210 and the microphone array 220 can be disposed along the width direction X of the vehicle. For example, the first vibration generator 210-1 and the second vibration generator 210-2 can be disposed at an upper surface (or a front surface) of an interior material of a vehicle ceiling using a second adhesive member 240.

The first vibration generator 210-1 and the second vibration generator 210-2 can be formed in the same structure. The following description of the vibration generator 210 can be identically applied to the first vibration generator 210-1 and the second vibration generator 210-2.

The vibration generator 210 can include at least one or more vibration devices 211. For example, the vibration device 211 can vibrate based on a vibration driving signal (or a sound signal) and can vibrate the region of the vehicle (or the vibration region), corresponding to the sound space SS where the sound generator 210 is disposed, to generate the sound S and can provide the sound S to the sound space SS.

As illustrated in FIG. 6, the vibration generator 210 can include one vibration device 211, but embodiments of the present disclosure are not limited thereto. For example, the vibration generator 210 can include a plurality of vibration devices 211. As illustrated in FIG. 7, the vibration generator 210 can include four vibration devices 211, but embodiments of the present disclosure are not limited thereto. For example, the vibration generator 210 can include two, three, or five or more vibration devices 211. In a case where the vibration generator 210 includes the plurality of vibration devices 211, the plurality of vibration devices 211 can be arranged as an M×N or N×M matrix type (where M is a natural number of 1 or more and N is a natural number of 2 or more).

Figure 12:
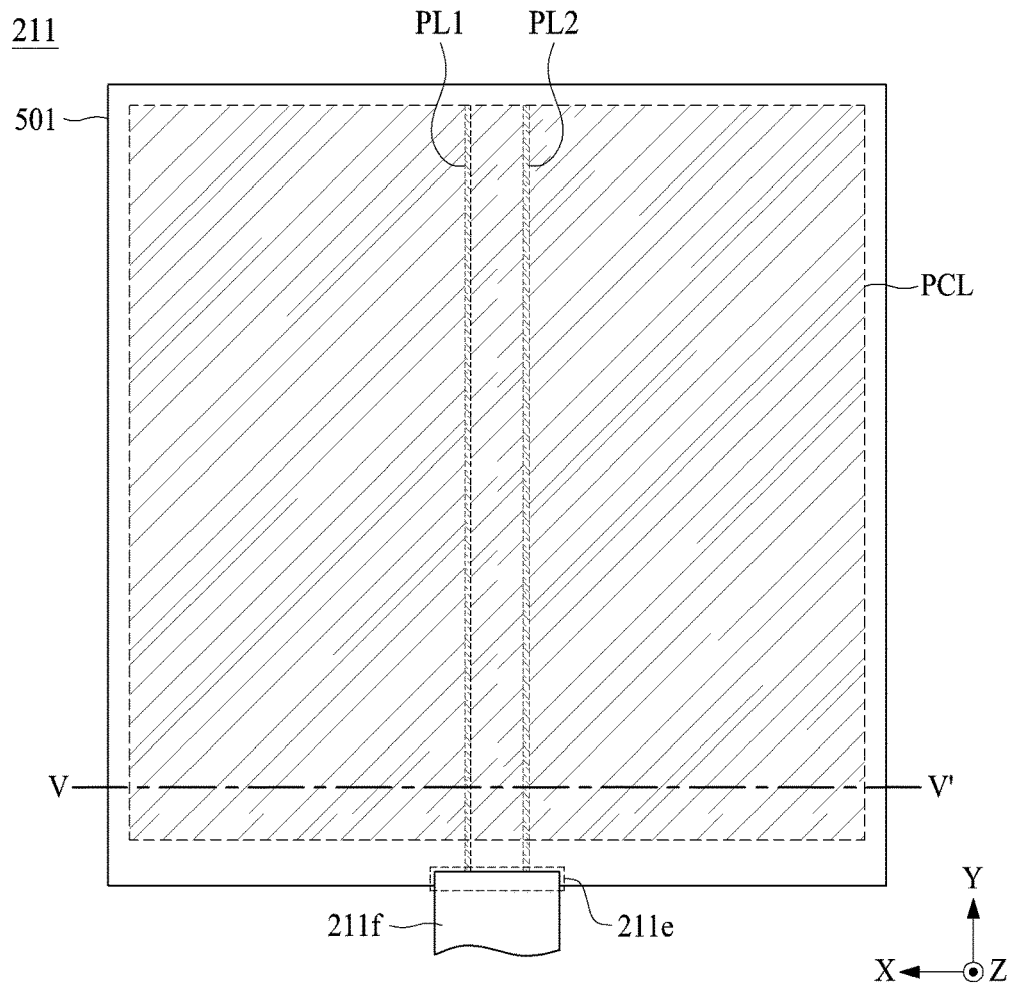
FIG. 12 illustrates a vibration device according to an embodiment of the present disclosure.
Figure 13:
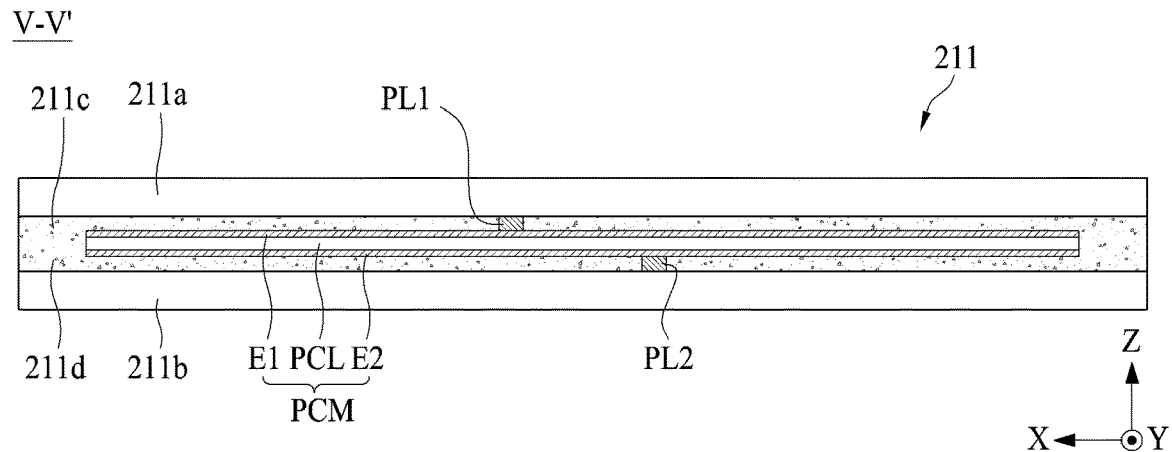
FIG. 13 is a cross-sectional view line V-V' illustrated in FIG. 12.

FIG. 12 illustrates a vibration module according to an embodiment of the present disclosure. FIG. 13 is a cross-sectional view line V-V' illustrated in FIG. 12.

With reference to FIGS. 12 and 13, a vibration device 211 according to an embodiment of the present disclosure can alternately and/or repeatedly contract and expand based on a piezoelectric effect (or a piezoelectric characteristic) to vibrate. For example, the vibration device 211 can alternately and/or repeatedly contract and expand based on an inverse piezoelectric effect to vibrate in a thickness direction Z, thereby directly vibrating the vibration region of the vehicle. For example, the vibration device 211 can have a tetragonal shape or a square shape, but embodiments of the present disclosure are not limited thereto.

The vibration device 211 according to an embodiment of the present disclosure can include a vibration portion (or a vibration layer) PCL, a first electrode layer E1, and a second electrode layer E2. The vibration portion PCL, the first electrode layer E1 and the second electrode layer E2 are part of a printed circuit module PCM, and as shown in FIG. 13.

The vibration portion PCL can include a piezoelectric material, a composite piezoelectric material, or an electroactive material, and the piezoelectric material, the composite piezoelectric material and the electroactive material can have a piezoelectric effect. The vibration portion PCL can be referred to as a vibration layer, a piezoelectric material layer, a piezoelectric composite layer, an electroactive layer, a piezoelectric material portion, a piezoelectric composite portion, an electroactive portion, a piezoelectric structure, a piezoelectric composite, or a piezoelectric ceramic composite, or the like, but embodiments of the present disclosure are not limited thereto.

The vibration portion PCL according to an embodiment of the present disclosure can include a ceramic-based material capable of realizing a relatively high vibration. For example, the vibration portion PCL can include a 1-3 composite structure or a 2-2 composite structure. For example, a piezoelectric deformation coefficient ($d_{33}$) of the vibration portion PCL in a thickness direction Z can have 1,000 pC/N or more, but embodiments of the present disclosure are not limited thereto.

The first electrode layer E1 can be disposed at a first surface (or an upper surface) of the vibration portion PCL and can be electrically connected to the first surface of the vibration portion PCL. For example, the first electrode layer E1 can have a single-body electrode type (or a common electrode type) which is disposed at a whole first surface of the vibration portion PCL. The first electrode layer E1 according an embodiment of the present disclosure can include a transparent conductive material, a semitransparent (or translucent) conductive material, or an opaque conductive material. For example, examples of the transparent conductive material or the semitransparent conductive material can include indium tin oxide (ITO) or indium zinc oxide (IZO), but embodiments of the present disclosure are not limited thereto. The opaque conductive material can include aluminum (Al), copper (Cu), gold (Au), silver (Ag), molybdenum (Mo), magnesium (Mg), or the like, and an alloy of any thereof, but embodiments of the present disclosure are not limited thereto.

The second electrode layer E2 can be at a second surface (or a rear surface) opposite to the first surface of the vibration portion PCL, and can be electrically connected to the second surface of the vibration portion PCL. For example, the second electrode layer E2 can have a single-body electrode type (or a common electrode type) which is disposed at a whole second surface of the vibration portion PCL. The second electrode layer E2 according to an embodiment of the present disclosure can include a transparent conductive material, a semitransparent conductive material, or an opaque conductive material. For example, the second electrode layer E2 can include the same material as the first electrode layer E1, but embodiments of the present disclosure are not limited thereto. As another embodiment of the present disclosure, the second electrode layer E2 can include a material different from the first electrode layer E1.

The vibration portion PCL can be polarized (e.g., poling) by a certain voltage applied to the first electrode layer E1 and the second electrode layer E2 in a certain temperature atmosphere, or in a temperature atmosphere that can be changed from a high temperature to a room temperature, but embodiments of the present disclosure are not limited thereto.

The vibration device 211 according to an embodiment of the present disclosure can further include a first protection member 211a and a second protection member 211b.

The first protection member 211a can be disposed over the first surface of the vibration portion PCL. For example, the first protection member 211a can cover the first electrode layer E1 disposed over the first surface of the vibration portion PCL. For example, the first protection member 211a can cover at least a portion of the first electrode layer E1, and may cover an entire surface of the first electrode layer E1. Further, the first electrode layer E1 can be disposed over the first surface of the vibration portion PCL. Thus, the first protection member 211a can support the first surface of the vibration portion PCL and can protect the first surface of the vibration portion PCL or the first electrode layer E1.

The first protection member 211a according to an embodiment of the present disclosure can be disposed at the first surface of the vibration portion PCL by a first adhesive layer 211c. For example, the first protection member 211a can be directly disposed at the first surface of the vibration portion PCL by a film laminating process using the first adhesive layer 211c.

The second protection member 211b can be disposed over the second surface of the vibration portion PCL. For example, the second protection member 211b can cover the second electrode layer E2 disposed over the second surface of the vibration portion PCL. For example, the second protection member 211b can cover at least a portion of the second electrode layer E2, and may cover an entire surface of the second electrode layer E2. Further, the second electrode layer E2 can be disposed over the second surface of the vibration portion PCL, which is opposite to the first surface of the vibration portion PCL. Thus, the second protection member 211b can support the second surface of the vibration portion PCL and can protect the second surface of the vibration portion PCL or the second electrode layer E2.

The second protection member 211b can be disposed at the second surface of the vibration portion PCL by a second adhesive layer 211d. For example, the second protection member 211b can be directly disposed at the second surface of the vibration portion PCL by a film laminating process using the second adhesive layer 211d.

Each of the first protection member 211a and the second protection member 211b according to an embodiment of the present disclosure can include a plastic film. For example, each of the first protection member 211a and the second protection member 211b can be a polyimide (PI) film or a polyethylene terephthalate (PET) film, but embodiments of the present disclosure are not limited thereto.

The first adhesive layer 211c can be disposed at the first surface of the vibration portion PCL. For example, the first adhesive layer 211c can be formed on a rear surface (or an inner surface) of the first protection member 211a facing the first surface of the vibration portion PCL and disposed at the first surface of the vibration portion PCL.

The second adhesive layer 211d can be disposed at the second surface of the vibration portion PCL. For example, the second adhesive layer 211d can be formed on a front surface (or any other surface, such as an inner surface) of the second protection member 211b facing the second surface of the vibration portion PCL and disposed at the second surface of the vibration portion PCL.

The vibration portion PCL can be surrounded by the first and second adhesive layers 211c and 211d. For example, the first and second adhesive layers 211c and 211d can entirely surround the whole vibration portion PCL. For example, the first and second adhesive layers 211c and 211d can be referred to as a cover member, but embodiments of the present disclosure are not limited thereto. When each of the first and second adhesive layers 211c and 211d is a cover member, the first protection member 211a can be disposed at a first surface of the cover member, and the second protection member 211b can be disposed at a second surface of the cover member. For example, for convenience of description, the first and second adhesive layers 211c and 211d are illustrated as first and second adhesive layers 211c and 211d, but embodiments of the present disclosure are not limited thereto and can be provided as one adhesive layer.

Each of the first and second adhesive layers 211c and 211d according to an embodiment of the present disclosure can include an electric insulating material which has adhesiveness and can include a material capable of compression and decompression. For example, each of the first and second adhesive layers 211c and 211d can include an epoxy resin, an acrylic resin, a silicone resin, or a urethane resin, but embodiments of the present disclosure are not limited thereto.

The vibration device 211 according to an embodiment of the present disclosure can further include a first power supply line PL1, a second power supply line PL2, and a pad part 211e.

The first power supply line PL1 can be disposed at the first protection member 211a. For example, the first power supply line PL1 can be disposed at a rear surface of the first protection member 211a facing the first surface of the vibration portion PCL. The first power supply line PL1 can be electrically connected to the first electrode layer E1. For example, the first power supply line PL1 can be directly and electrically connected to the first electrode layer E1. For example, the first power supply line PL1 can be electrically connected to the first electrode layer E1 by an anisotropic conductive film (or any type of conductive film). As another embodiment of the present disclosure, the first power supply line PL1 can be electrically connected to the first electrode layer E1 by a conductive material (or particle) included in the first adhesive layer 211c.

The second power supply line PL2 can be disposed at the second protection member 211b. For example, the second power supply line PL2 can be disposed at a front surface of the second protection member 211b facing the second surface of the vibration portion PCL. The second power supply line PL2 can be electrically connected to the second electrode layer E2. For example, the second power supply line PL2 can be directly and electrically connected to the second electrode layer E2. For example, the second power supply line PL2 can be electrically connected to the second electrode layer E2 by an anisotropic conductive film (or any type of conductive film). As another embodiment of the present disclosure, the second power supply line PL2 can be electrically connected to the second electrode layer E2 by a conductive material (or particle) included in the second adhesive layer 211d.

The pad part 211e can be electrically connected to the first power supply line PL1 and the second power supply line PL2. For example, the pad part 211e can be electrically connected to one portion (or one end) of each of the first power supply line PL1 and the second power supply line PL2. The pad part 211e according to an embodiment of the present disclosure can include a first pad electrode and a second pad electrode. The first pad electrode can be electrically connected to one portion of the first power supply line PL1. The second pad electrode can be electrically connected to one portion of the second power supply line PL2.

The vibration device 211 according to an embodiment of the present disclosure can further include a flexible cable 211f.

The flexible cable 211f can be electrically connected to the pad part 211e disposed at the vibration device 211 and can supply a vibration driving signal provided from an external device (for example, a sound processing circuit) to the first and second electrode layers E1 and E2. The flexible cable 211f according to an embodiment of the present disclosure can include a first terminal and a second terminal. A first terminal can be electrically connected to the first pad electrode of the pad part 211e. The second terminal can be electrically connected to the second pad electrode of the pad part 211e. For example, the flexible cable 211f can be configured as a flexible printed circuit cable or a flexible flat cable, but embodiments of the present disclosure are not limited thereto.

According to an embodiment of the present disclosure, the vibration driving signal can be a driving signal having an alternating current (AC) form including a driving signal of a first polarity and a driving signal of a second polarity. The driving signal of the first polarity can be any one of a positive (+) driving signal and a negative (−) driving signal, and the driving signal of the second polarity can be any one of a positive (+) driving signal and a negative (−) driving signal. For example, the driving signal of the first polarity can be supplied to the first electrode layer E1 through the first terminal of the flexible cable 211f, the first pad electrode of the pad part 211e, and the first power supply line PL1. The driving signal of the second polarity can be supplied to the second electrode layer E2 through the second terminal of the flexible cable 211f, the second pad electrode of the pad part 211e, and the second power supply line PL2.

The vibration portion PCL according to an embodiment of the present disclosure can include a plurality of first portions and a plurality of second portions between the plurality of first portions. The first portion can be an inorganic material, and the second portion can be an organic material. The first portion and the second portion can be formed in a structure connected to each other on a plane, and thus, the vibration device 211 can be implemented as one film. Based on such a configuration, comparing with a structure where a plurality of piezoelectric elements are stacked, the vibration device 211 can be implemented as one film, and thus, a vibration generator 210 having a thin thickness can be implemented (i.e., a relatively thin thickness).

Each of the plurality of first portions according to an embodiment of the present disclosure can include an inorganic material or a piezoelectric material, each of which vibrating based on a piezoelectric effect (or a piezoelectric characteristic) caused by an electric field. For example, each of the plurality of first portions can be referred to as an electroactive portion, an inorganic material portion, a piezoelectric material portion, or a vibration portion, or the like, but embodiments of the present disclosure are not limited thereto.

According to an embodiment of the present disclosure, each of the plurality of first portions can include a ceramic-based material for generating a relatively high vibration, or can include a piezoelectric ceramic having a perovskite-based crystalline structure (e.g., $CaTiO_3$). The perovskite crystalline structure can have a piezoelectric effect and/or an inverse piezoelectric effect, and can be in the form of a plate-shaped structure having an orientation. The perovskite crystalline structure can be represented by a chemical formula "$ABO_3$". In the chemical formula, "A" can include a divalent metal element, and "B" can include a tetravalent metal element. For example, in the chemical formula "$ABO_3$", "A", and "B" can be cations, and "O" can be anions. For example, the first portion can include one of lead(II) titanate ($PbTiO_3$), lead zirconate ($PbZrO_3$), lead zirconate titanate ($PbZrTiO_3$), barium titanate ($BaTiO_3$), and strontium titanate ($SrTiO_3$), but embodiments of the present disclosure are not limited thereto.

When the perovskite crystalline structure includes a center ion (for example, $PbTiO_3$, e.g., lead (II) titanate, lead titanium oxide, or lead titanate with a perovskite structure), a position of a titanium (Ti) ion can be changed by an external stress or a magnetic field. Thus, polarization can be changed, thereby generating a piezoelectric effect. For example, in the perovskite crystalline structure, a cubic shape corresponding to a symmetric structure can be changed to a tetragonal (or quadrilateral), orthorhombic, or rhombohedral structure corresponding to an unsymmetric structure. Thus, a piezoelectric effect can be generated. In a tetragonal, orthorhombic, or rhombohedral structure corresponding to an unsymmetric structure, polarization can be high in a morphotropic phase boundary, and realignment of polarization can be easy, whereby the perovskite crystalline structure can have a high piezoelectric characteristic.

According to an embodiment of the present disclosure, the inorganic material portion configured in each of the plurality of first portions can include a material, including one or more of lead (Pb), zirconium (Zr), titanium (Ti), zinc (Zn), nickel (Ni), and niobium (Nb), but embodiments of the present disclosure are not limited thereto. As other embodiments of the present disclosure, the inorganic material portion provided in each of the plurality of first portions can include a lead zirconate titanate (PZT)-based material, including lead (Pb), zirconium (Zr), and titanium (Ti); or can include a lead zirconate nickel niobate (PZNN)-based material, including lead (Pb), zirconium (Zr), nickel (Ni), and niobium (Nb), but embodiments of the present disclosure are not limited thereto. Also, the inorganic material portion can include at least one of calcium titanate ($CaTiO_3$), $BaTiO_3$, and $SrTiO_3$, each without Pb, but embodiments of the present disclosure are not limited thereto.

The plurality of second portions according to an embodiment of the present disclosure can have modulus and viscoelasticity that are lower than those of the first portion, and thus, the second portion can enhance the reliability of the first portion vulnerable to an impact due to a fragile characteristic. For the vibration device 211 to have an impact resistance and high stiffness, each of the plurality of second portions can include a material having a relatively high damping factor (tan δ) and relatively high stiffness. For example, each of the plurality of second portions can include a material having a damping factor (tan δ) of about 0.1 [GPa] to about 1 [GPa] and relatively high stiffness of about 0 [GPa] to about 10 [GPa]. Also, a damping factor (tan δ) and a stiff characteristic can be described based on a correlation between a loss coefficient and modulus. For example, the plurality of second portions can include a material having a loss coefficient of about 0.01 to about 1.0 and modulus of about 0.1 [GPa] to about 10 [GPa].

The organic material configured in each of the plurality of second portions can include an organic material or an organic polymer that has a flexible characteristic in comparison with the inorganic material portion of each of the first portions. For example, each of the plurality of second portions can include an organic material, an organic polymer, an organic piezoelectric material, or an organic non-piezoelectric material. For example, each of the plurality of second portions can be referred to as an adhesive portion, an elastic portion, a bending portion, a damping portion, or a flexible portion having flexibility, but embodiments of the present disclosure are not limited thereto.

An organic material according to an embodiment of the present disclosure can include at least one or more of an organic piezoelectric material and an organic non-piezoelectric material.

An organic material including an organic piezoelectric material can absorb an impact applied to an inorganic material (or a first portion), and thus, the organic material can enhance the total durability of the vibration device 211, and can provide a piezoelectric characteristic corresponding to a certain level or more. The organic piezoelectric material according to an embodiment of the present disclosure can be an organic material having an electro-active characteristic. An organic material including an organic non-piezoelectric material can be configured to include a curable resin composition and an adhesive including the curable resin composition, and thus, the organic material can absorb an impact applied to an inorganic material (or a first portion), thereby enhancing the total durability of the vibration device 211. The organic non-piezoelectric material according to an embodiment of the present disclosure can include at least one or more of an epoxy-based polymer, an acrylic-based polymer, and a silicone-based polymer, but embodiments of the present disclosure are not limited thereto.

According to an embodiment of the present disclosure, an organic material including an organic non-piezoelectric material can include an adhesion promoter or an adhesion enhancing agent for adhesiveness between epoxy resin and an inorganic material portion, for a high stiffness characteristic for the vibration device 211. For example, the adhesion promoter can be phosphate-based or the like. The organic material can be cured by at least one curing process of a thermal curing process and a photo-curing process. In a process of curing the organic material portion, solvent free type epoxy resin can be used for avoiding or preventing the thickness uniformity of the vibration device 211 from being reduced by contraction of the organic material portion caused by volatilization of a solvent.

Also, the organic material including the organic non-piezoelectric material can further include a reinforcing agent for a damping characteristic in addition to high stiffness of the vibration device 211. For example, the reinforcing agent can be methyl methacrylate-butadiene-styrene (MBS) of a core shell type, and a content thereof can be about 5 wt % to about 40 wt %. The reinforcing agent can be an elastic body having the core cell type, and can have a high coupling force to epoxy resin, such as an acrylic-based polymer, and thus, the reinforcing agent can enhance an impact resistance or a damping characteristic of the sound generating device 200.

According to an embodiment of the present disclosure, the plurality of first portions and the plurality of second portions can have the same size (e.g., a width and/or a length) or different sizes (e.g., widths and/or lengths) from each other, can be alternately and repeatedly disposed along a first direction X (or a second direction Y), and can include a line shape or a stripe shape. For example, the plurality of first portions can be spaced apart from one another along the first direction X and the second direction Y, and can be configured to fill a gap between two adjacent first portions or to surround each of the plurality of first portions. For example, each of the plurality of first portions can have the same size, can be disposed at a lattice shape, and can have a planar structure such as a circular shape, an oval shape, a polygonal shape, or a donut shape, or the like.

With reference to FIGS. 6 to 8, 10 and 11, the vibration generator 210 can further include a plate 212. The plate 212 can be disposed at the front surface or the rear surface of the vibration device 211. For example, as illustrated in FIG. 7, when the vibration generator 210 includes a plurality of the vibration devices 211, the plate 212 can be disposed at the front surface or the rear surface of plurality of the vibration devices 211 in common, but embodiments of the present disclosure are not limited thereto. For example, a single plate 212 may be disposed at the front surface or the rear surface of all of the plurality of vibration devices 211. For example, when the vibration generator 210 includes a plurality of the vibration devices 211, the plate 212 can be disposed at each of the front surface or the rear surface of plurality of the vibration devices 211.

The plate 212 can be disposed at the rear surface of the vibration devices 211, can reinforce a mass of the vibration devices 211 to decrease a resonance frequency of the vibration devices 211 based on an increase in mass, and thus, can increase a sound characteristic and a sound pressure level characteristic of the low-pitched sound band generated based on a vibration of the vibration devices 211 and can enhance the flatness of the sound characteristic. For example, the flatness of a sound characteristic can be a magnitude of a deviation between a highest sound pressure level and a lowest sound pressure level. For example, the plate 212 can be referred to as a weight member, a mass member, a sound planarization member, or the like, but embodiments of the present disclosure are not limited thereto.

According to an embodiment of the present disclosure, the plate 212 can include a mass of a high-density material, for example a metal material. The plate 212 can include one or more materials of stainless steel, aluminum (Al), a magnesium (Mg), a magnesium (Mg) alloy, a magnesium-lithium (Mg—Li) alloy, and an aluminum (Al) alloy, but embodiments of the present disclosure are not limited thereto.

According to an embodiment of the present disclosure, the plate 212 can be disposed at the vibration devices 211 by a third adhesive member 213. For example, the third adhesive member 213 can be disposed between at the vibration devices 211 and the plate 212. For example, the third adhesive member 213 can be an adhesive member of an acrylic-based or a urethane-based, but embodiments of the present disclosure are not limited thereto. For example, the third adhesive member 213 can be a double-sided foam adhesive pad having an adhesive layer of the acrylic-based or an adhesive resin cured layer of the acrylic-based.

With reference to FIGS. 6 to 11, a microphone array 220 according to an embodiment of the present disclosure can be disposed adjacent to a vibration generator 210. For example, the microphone array 220 can be disposed between a first vibration generator 210-1 and a second vibration generator 210-2. For example, the microphone array 220 can be configured with a plurality of microphones 221 on which beamforming is capable of being controlled. A sound generating device 200 according to an embodiment of the present disclosure can include the microphone array 220 configured with the plurality of microphones 221, and thus, can receive noise occurring at a desired position, based on the beamforming control of the plurality of microphones 221. The noise received by the microphone array 220 can be used for active noise cancellation (ANC). The noise received by the microphone array 220 can receive noise near thereof and can provide a noise processing circuit with an electrical signal (or a noise signal) corresponding to the noise. For example, some (for example, a first microphone group) of the plurality of microphones 221 can be for receiving noise for ANC, and the other microphones (for example, a first microphone group) of the plurality of microphones 221 can be for receiving noise for measuring a reduced noise characteristic. For example, noise received by some of the plurality of microphones 221 can be used as noise for ANC, and noise received by the other microphones of the plurality of microphones 221 can be used as noise for measuring a reduced noise characteristic.

The sound generating device 200 according to an embodiment of the present disclosure can be disposed at each of a plurality of sound spaces SS1 to SS4, and thus, the microphone array 220 of the sound generating device 200 can be disposed at each of the plurality of sound spaces (for example, first to fourth sound spaces) SS1, SS2, SS3, and SS4.

According to an embodiment of the present disclosure, a plurality of microphones 221 of a microphone array 220 of a sound generating device 200 disposed at the first sound space SS1 can receive the internal noise of the first sound space SS1. For example, a plurality of microphones 221 of a microphone array 220 of a sound generating device 200 disposed at the second sound space SS2 can receive the internal noise of the second sound space SS2. For example, a plurality of microphones 221 of a microphone array 220 of a sound generating device 200 disposed at the third sound space SS3 can receive the internal noise of the third sound space SS3. For example, a plurality of microphones 221 of a microphone array 220 of a sound generating device 200 disposed at the fourth sound space SS4 can receive the internal noise of the fourth sound space SS4.

According to an embodiment of the present disclosure, the plurality of microphones 221 can be arranged in a width direction X of the vehicle, but embodiments of the present disclosure are not limited thereto. For example, the plurality of microphones 221 can be arranged as an M×N or N×M matrix type (where M is a natural number of 1 or more and N is a natural number of 2 or more).

With reference to FIGS. 6 and 10, a hole 1a can be formed in a vehicle ceiling corresponding to each of the plurality of microphones 221. For example, a hole 1a may be formed for each microphone 221 and each hole 1a may be disposed adjacent to and/or below a corresponding one of the microphones 221. For example, the hole 1a can be formed at an interior material 3 of a vehicle ceiling 1. For example, the hole 1a can be formed at the interior material 3 of the vehicle ceiling 1 to correspond to a microphone array 220. For example, the hole 1a can be formed at the interior material 3 of the vehicle ceiling 1 to correspond to the microphone 221 of the microphone array 220. For example, the hole 1a can be formed at the interior material 3 of the vehicle ceiling 1 to correspond to a groove 233a (see FIG. 9) formed at a frame 230 of the sound generating device 200. As described above, the hole 1a corresponding to the plurality of microphones 221 can be formed at the interior material 3 of the vehicle ceiling 1, and thus, can increase sound reception efficiency for receiving a sound occurring at a desired position.

With reference to FIGS. 6 to 11, the sound generating device 200 according to an embodiment of the present disclosure can further include a frame 230. For example, the frame 230 can be disposed between the vibration generator 210 and the microphone array 220. For example, the frame 230 can support the vibration generator 210 and the microphone array 220 and can stably fix the vibration generator 210 and the microphone array 220 to the vehicle ceiling 1. For example, the frame 230 can be disposed at a front surface of the vibration generator 210 and a front surface of the microphone array 220 to cover the vibration generator 210 and the microphone array 220. For example, the frame 230 can include a film material having a flexible characteristic. For example, the frame 230 can include polyimide (PI) or flexible copper clad laminate (FCCL), but embodiments of the present disclosure are not limited thereto. For example, the frame 230 can be disposed at a rear surface of the vehicle ceiling 1 by a second adhesive member 240.

With reference to FIG. 9, a frame 230 can include a first frame portion 231 and a second frame portion 233. For example, the first frame portion 231 and the second frame portion 233 can be provided as one body or a single body.

According to an embodiment of the present disclosure, the first frame portion 231 can be disposed at a front surface of the vibration generator 210. For example, the first frame portion 231 can support the vibration generator 210 and can stably fix the vibration generator 210 to the vehicle ceiling 1.

According to an embodiment of the present disclosure, the first frame portion 231 can cover a front periphery and a side surface of the vibration generator 210. For example, the first frame portion 231 can cover a front periphery and a side surface of the vibration device 211 of the vibration generator 210. For example, the first frame portion 231 can include a plurality of opening portions 231a-1 and 231a-2. For example, the first frame portion 231 can include the plurality of opening portions 231a-1 and 231a-2 corresponding to a center region of the vibration generator 210. For example, a plate 212 can be disposed at a region (an exposure region) of the vibration device 211 exposed through each of the opening portions 231a-1 and 231a-2.

According to an embodiment of the present disclosure, the first frame portion 231 can include a 1-1$^{st}$ frame portion 231-1 and a 1-2$^{nd}$ frame portion 231-2.

According to an embodiment of the present disclosure, the 1-1$^{st}$ frame portion 231-1 can be disposed at a front surface of the first vibration generator 210-1 and can support the first vibration generator 210-1. For example, the 1-1$^{st}$ frame portion 231-1 can cover the first vibration generator 210-1. For example, the 1-1$^{st}$ frame portion 231-1 can cover a front periphery and a side surface of the first vibration generator 210-1. For example, the 1-1$^{st}$ frame portion 231-1 can cover a vibration module (or a first vibration module) 211-1 of the first vibration generator 210-1. For example, the 1-1$^{st}$ frame portion 231-1 can cover a front periphery and a side surface of a first vibration device 211-1 of the first vibration generator 210-1. For example, the 1-1$^{st}$ frame portion 231-1 can include an opening portion (or a first opening portion) 231a-1 corresponding to a center region of the first vibration generator 210-1. For example, a plate (or a first plate) 212-1 can be disposed at a region of the first vibration device 211-1 exposed through the first opening portion 231a-1.

According to an embodiment of the present disclosure, the 1-2$^{nd}$ frame portion 231-2 can be disposed at a front surface of the second vibration generator 210-2 and can support the second vibration generator 210-2. For example, the 1-2$^{nd}$ frame portion 231-2 can cover the second vibration generator 210-2. For example, the 1-2$^{nd}$ frame portion 231-2 can cover a front periphery and a side surface of the second vibration generator 210-2. For example, the 1-2$^{nd}$ frame portion 231-2 can cover a vibration module (or a second vibration module) 211-2 of the second vibration generator 210-2. For example, the 1-2$^{nd}$ frame portion 231-2 can cover a front periphery and a side surface of a second vibration device 211-2 of the second vibration generator 210-2. For example, the 1-2$^{nd}$ frame portion 231-2 can include an opening portion (or a second opening portion) 231a-2 corresponding to a center region of the second vibration generator 210-2. For example, a plate (or a second plate) 212-2 can be disposed at a region of the second vibration device 211-2 exposed through the second opening portion 231a-2.

The second frame portion 233 according to an embodiment of the present disclosure can be disposed at the vehicle ceiling 1. For example, the second frame portion 233 can be disposed at a front surface of the microphone array 220. For example, the second frame portion 233 can support the microphone array 220 and can stably fix the microphone array 220 to the vehicle ceiling 1. For example, the second frame portion 233 can cover the microphone array 220.

According to an embodiment of the present disclosure, the second frame portion 233 can be disposed between the 1-1$^{st}$ frame portion 231-1 and the 1-2$^{nd}$ frame portion 231-2 and can be connected between the 1-1$^{st}$ frame portion 231-1 and the 1-2$^{nd}$ frame portion 231-2.

According to an embodiment of the present disclosure, the second frame portion 233 can include a groove 233a which is formed to correspond to (or overlap) the microphone 221 of the microphone array 220. For example, the groove 233a formed in the second frame portion 233 can correspond to (or overlap) a hole 1a formed in the vehicle ceiling 1. For example, the microphone 221 of the microphone array 220 can be disposed at (or inserted or accommodated into) the groove 233a formed in the second frame portion 233.

Figure 14:
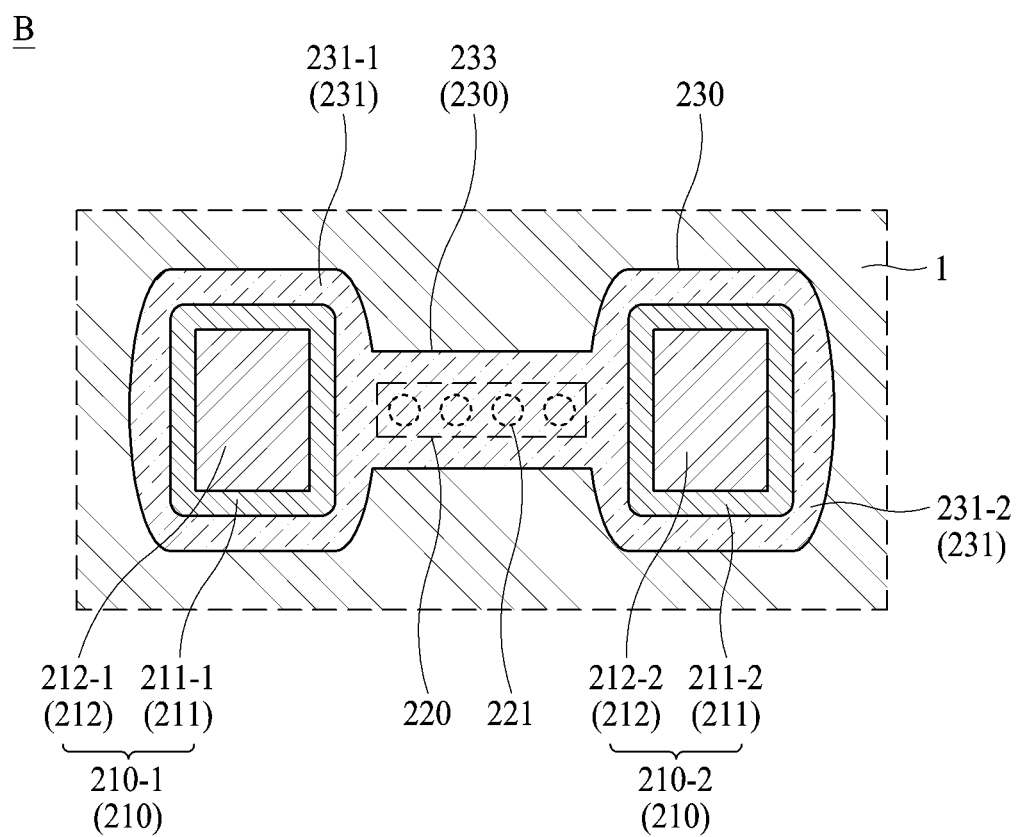
FIG. 14 illustrates a sound generating device according to another embodiment of the present disclosure.
Figure 15:
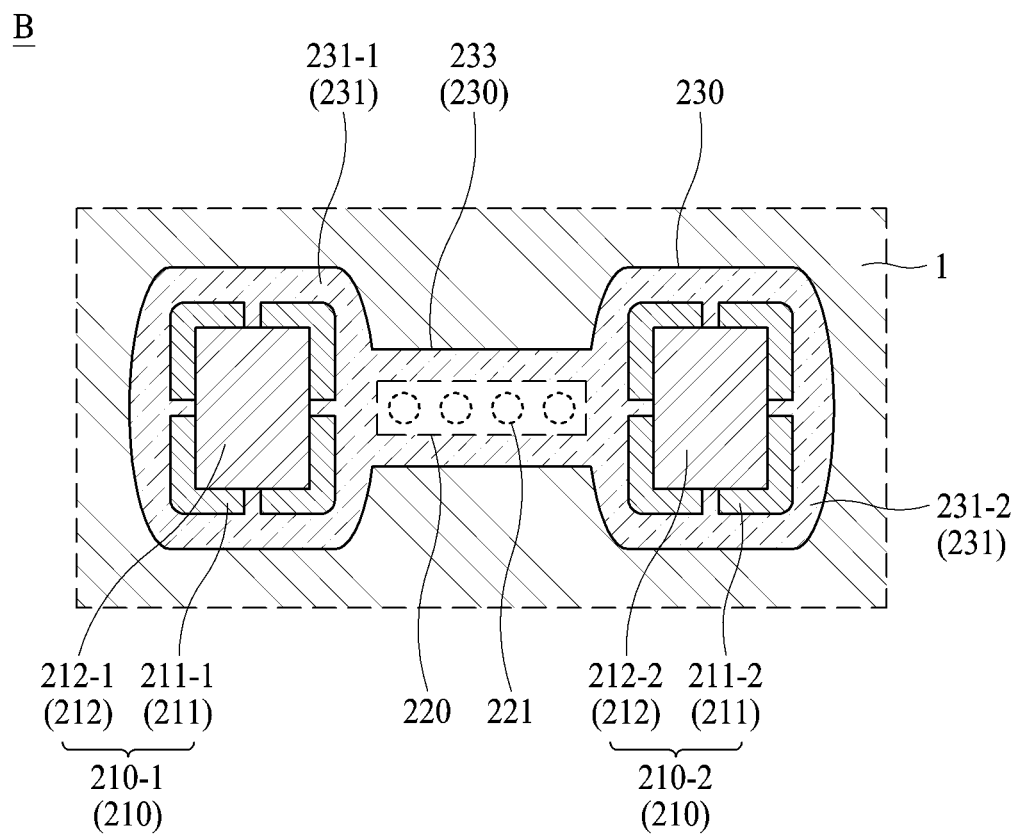
FIG. 15 illustrates a sound generating device according to another embodiment of the present disclosure.

FIGS. 14 and 15 illustrate a sound generating device according to another embodiment of the present disclosure. FIG. 14 illustrates an embodiment implemented by modifying the vibration generator 210 and the frame 230 of the sound generating device 200 in FIG. 6. FIG. 15 illustrates an embodiment implemented by modifying the vibration generator 210 and the frame 230 of the sound generating device 200 in FIG. 7. Hereinafter, repeated descriptions of the same elements other than a modified element and elements relevant thereto will be briefly given or are omitted.

With reference to FIG. 14, in a sound generating device 200 according to another embodiment of the present disclosure, a corner of a vibration device 211 of a vibration generator 210 can have a rounded shape. For example, the vibration device 211 can be formed in a tetragonal shape where four corners thereof are rounded, a circular shape, or an oval shape. As described above, when the vibration device 211 including a rounded corner is applied, a dip phenomenon of a sound can be reduced, and thus, the sound generating device 200 can provide a sound having a flat sound characteristic. For example, the vibration device 211 of the vibration generator 210 and a first frame 231 of a frame 230 can have the same shape.

In the sound generating device 200 according to another embodiment of the present disclosure, a corner of the first frame 231 can have a rounded shape. For example, the first frame 231 can be formed in a tetragonal shape where four corners thereof are rounded, a circular shape, or an oval shape. As described above, when the first frame 231 including a rounded corner is applied, a dip phenomenon of a sound can be reduced, and thus, the sound generating device 200 can provide a sound having a flat sound characteristic. For example, the dip phenomenon can be a phenomenon where a sound pressure level bounces in a specific frequency.

With reference to FIG. 15, in a sound generating device 200 according to another embodiment of the present disclosure, a corner of each of a plurality of vibration devices 211 of a vibration generator 210 can have a rounded shape. For example, the plurality of vibration devices 211 of a vibration generator 210 can be formed in a tetragonal shape where four corners thereof are rounded, a circular shape, or an oval shape. For example, the plurality of vibration devices 211 of a vibration generator 210 and a first frame 231 of a frame 230 can have the same shape.

According to an embodiment of the present disclosure, a corner, corresponding to a corner of the first frame 231, of corners of each of the plurality of vibration devices 211 can have a rounded shape. For example, the vibration generator 210 can include the plurality of vibration devices 211, and each of the plurality of vibration devices 211 can have a tetragonal shape where a corner thereof corresponding to a corner of the first frame 231 is rounded. For example, all corners of each of the plurality of vibration devices 211 can have a rounded shape. For example, the vibration generator 210 can include the plurality of vibration devices 211, and each of the plurality of vibration devices 211 can have a tetragonal shape where all corners thereof are rounded. As described above, when the vibration device 211 including a rounded corner is applied, a dip phenomenon (e.g., frequency dip) of a sound can be reduced, and thus, the sound generating device 200 can provide a sound having a flat sound characteristic.

In the sound generating device 200 according to another embodiment of the present disclosure, a corner of the first frame 231 of the frame 230 can have a rounded shape. For example, the first frame 231 can be formed in a tetragonal shape where four corners thereof are rounded. As described above, when the first frame 231 including a rounded corner is applied, a dip phenomenon of a sound can be reduced, and thus, the sound generating device 200 can provide a sound having a flat sound characteristic.

Figure 16:
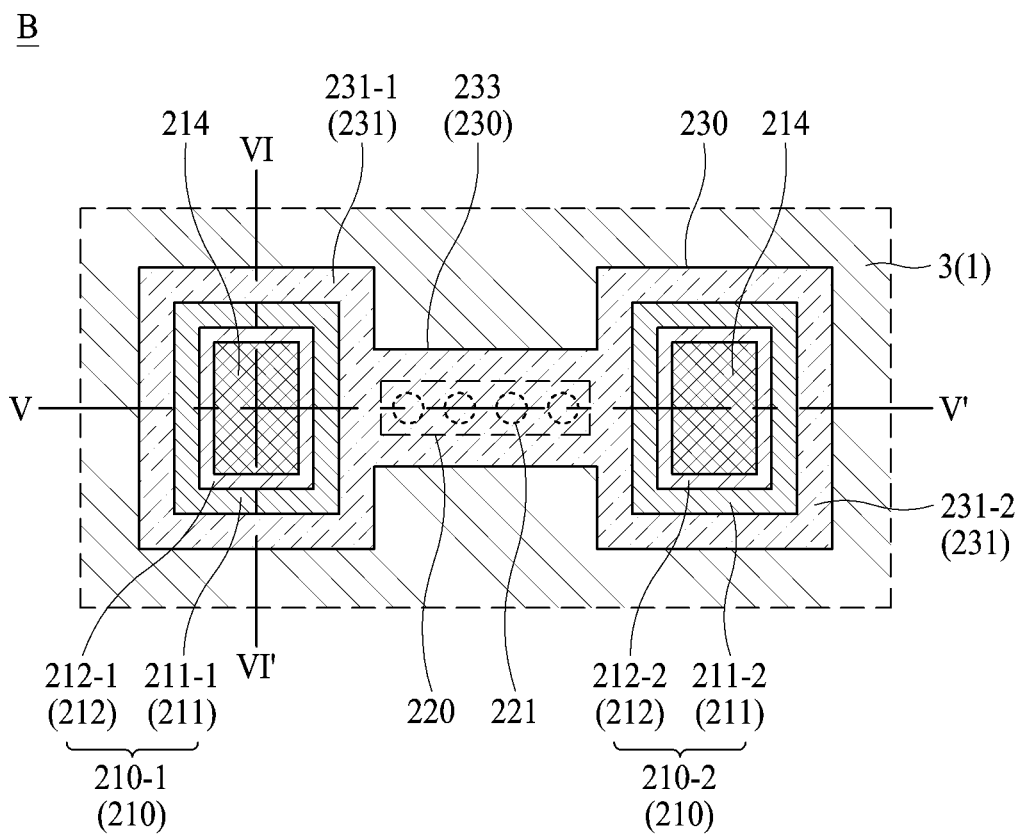
FIG. 16 illustrates a sound generating device according to another embodiment of the present disclosure.
Figure 17:
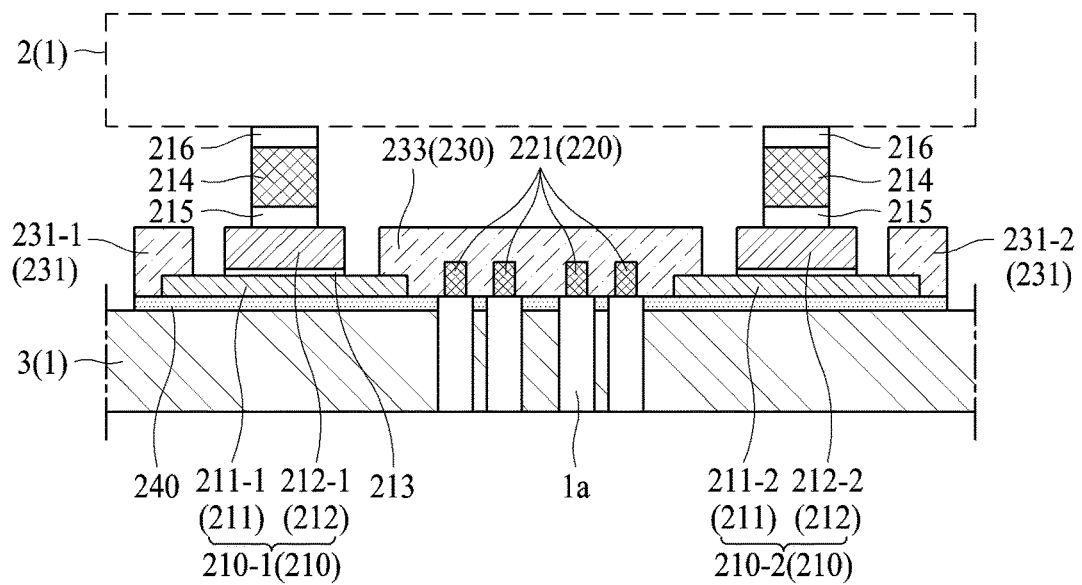
FIG. 17 is a cross-sectional view taken along line V-V' illustrated in FIG. 16.
Figure 18:
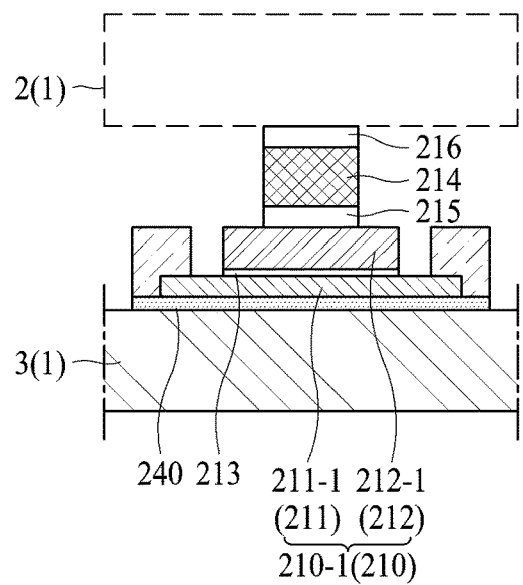
FIG. 18 is a cross-sectional view taken along line VI-VI' illustrated in FIG. 16.

FIG. 16 illustrates a sound generating device according to another embodiment of the present disclosure. FIG. 17 is a cross-sectional view taken along line V-V illustrated in FIG. 16. FIG. 18 is a cross-sectional view taken along line VI-VI' illustrated in FIG. 16.

FIG. 16 illustrates an embodiment implemented by adding a vibration transfer member 214 to the vibration generator 210 of the sound generating device 200 of FIG. 6. Hereinafter, repeated descriptions of the same elements other than a modified element and elements relevant thereto will be briefly given or are omitted.

With reference to FIGS. 16 to 18, in a sound generating device 200 according to another embodiment of the present disclosure, a vibration generator 210 can further include a vibration transfer member 214. For example, the vibration transfer member 214 can be disposed on an upper surface (or a front surface) of a vibration device 211. For example, the vibration transfer member 214 can be disposed on an upper surface (or a front surface) of a plate 212. For example, the vibration transfer member 214 can be connected to a lower surface (or a rear surface) of a frame 2 of a vehicle ceiling 1.

According to an embodiment of the present disclosure, the vibration transfer member 214 can include a material, such as polyurethane or polyolefin, so as to enhance the transfer efficiency of a vibration of the vibration generator 210, but embodiments of the present disclosure are not limited thereto. According to an embodiment of the present disclosure, because the vibration transfer member 214 is provided at the vibration generator 210, a vibration of the vibration generator 210 can be efficiently transferred to an interior material 3 of the vehicle ceiling 1, thereby enhancing a sound characteristic and/or a sound pressure level characteristic.

According to an embodiment of the present disclosure, the vibration transfer member 214 can be disposed on an upper surface (or a front surface) of the vibration device 211 or an upper surface (or a front surface) of the plate 212 by a fourth adhesive member 215. For example, the fourth adhesive member 215 can be disposed between the upper surface (or the front surface) of the vibration device 211 and a lower surface (or a rear surface) of the vibration transfer member 214. For example, the fourth adhesive member 215 can be disposed between the upper surface (or the front surface) of the plate 212 and the lower surface (or the rear surface) of the vibration transfer member 214.

According to an embodiment of the present disclosure, the vibration transfer member 214 can be disposed at a lower surface (or a rear surface) of the frame 2 of the vehicle ceiling 1 by a fifth adhesive member 216. For example, the fifth adhesive member 216 can be disposed between the upper surface (or the front surface) of the vibration transfer member 214 and the bottom surface (or the rear surface) of the frame 2 of the vehicle ceiling 1.

According to an embodiment of the present disclosure, one of more of the fourth adhesive member 215 and the fifth adhesive member 216 can include a foam pad, a double-sided tape, or an adhesive, but embodiments of the present disclosure are not limited thereto. For example, an adhesive layer of each of the fourth adhesive member 215 and the fifth adhesive member 216 can include epoxy, acryl, silicone, or urethane, but embodiments of the present disclosure are not limited thereto. For example, the adhesive layer of each of the fourth adhesive member 215 and the fifth adhesive member 216 can include a urethane-based material which has a relatively ductile characteristic compared to acryl of acryl and urethane.

Figure 19:
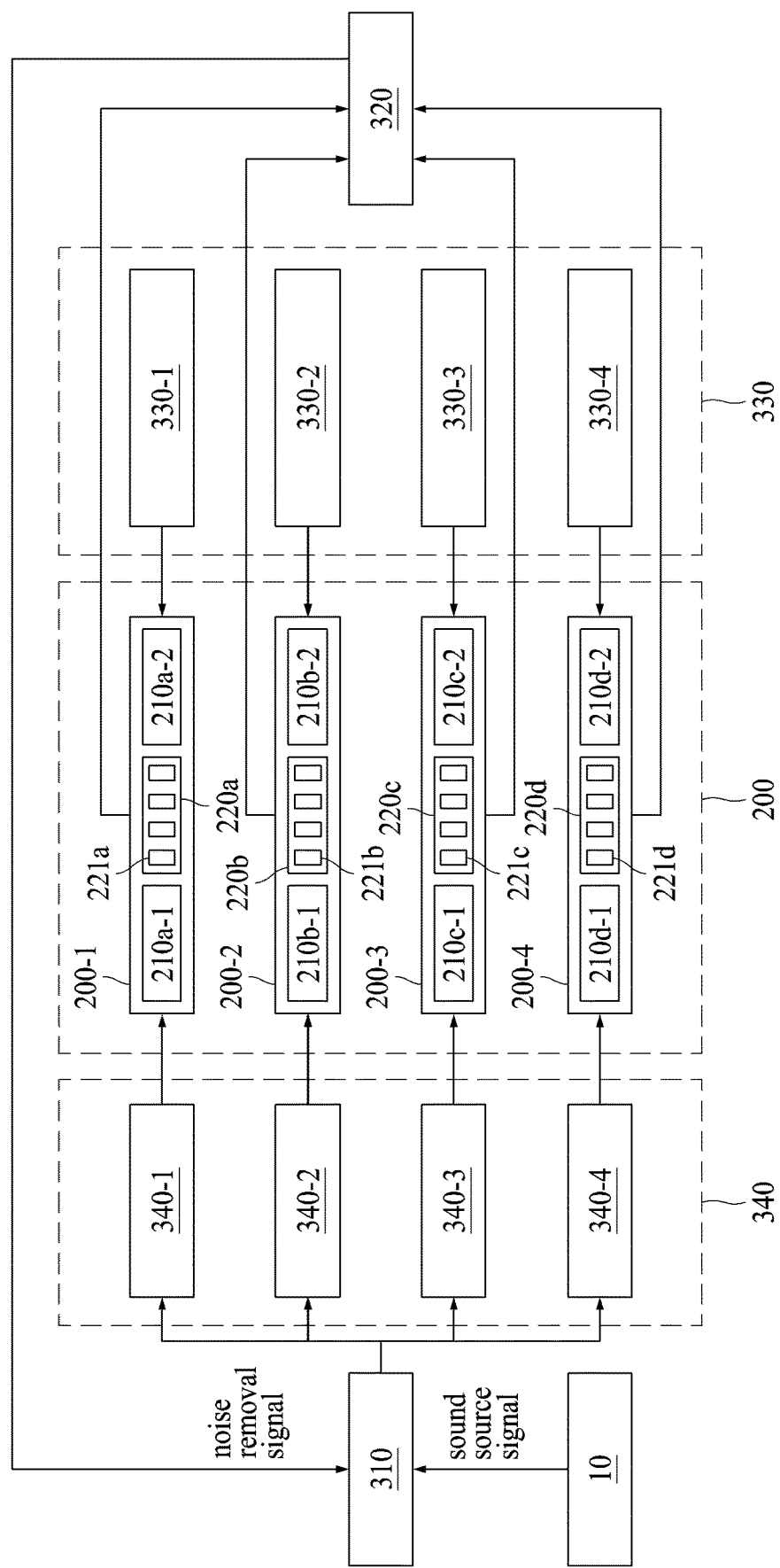
FIG. 19 illustrates a sound control system for vehicles according to an embodiment of the present disclosure.

FIG. 19 illustrates a sound control system for vehicles according to an embodiment of the present disclosure.

With reference to FIGS. 1, 2, and 19, the sound control system for vehicles according to an embodiment of the present disclosure can control a sound generating device 200 disposed at a sound space SS formed by an enclosure 100 disposed at a vehicle ceiling, based on a vibration driving signal corresponding to a sound source, thereby providing a sound S to the sound space SS.

According to an embodiment of the present disclosure, the sound control system for vehicles can include the sound generating device 200 and a sound processing circuit (or a first signal processing circuit) 310, but embodiments of the present disclosure are not limited thereto. For example, the sound control system for vehicles can further include a noise processing circuit (or a second signal processing circuit or a noise removal signal generating circuit) 320, a beamforming control device 330, and an amplification circuit part 340.

The sound generating device 200 can be the same as the sound generating device 200 described above with reference to FIGS. 6 to 18, and thus, its description is omitted or will be briefly given below.

According to an embodiment of the present disclosure, the sound generating device 200 can be disposed at the sound space SS within the enclosure 100 and can vibrate a vehicle vibration region (or a vibration region) corresponding to the sound space SS based on the vibration driving signal (or a sound signal) from the sound processing circuit 310 to provide the sound S to the sound space SS.

According to an embodiment of the present disclosure, vibration generators 210-1 and 210-2 of the sound generating device 200 can vibrate based on the vibration driving signal, and the vehicle vibration region corresponding to the sound space SS can vibrate based on vibrations of the vibration generators 210-1 and 210-2, whereby the sound S can be provided to the sound space SS based on a vibration of the vehicle vibration region.

The sound generating device 200 can include first to fourth sound generating devices 200-1, 200-2, 200-3, and 200-4, but embodiments of the present disclosure are not limited thereto.

According to an embodiment of the present disclosure, the first sound generating device 200-1 can be disposed at a first sound space SS1 within a first enclosure 100-1 and can vibrate a first vehicle vibration region (or a first vibration region) corresponding to the first sound space SS1 based on a first vibration driving signal (or a first sound signal) from the sound processing circuit 310 to provide a first sound S1 to the first sound space SS1. For example, vibration generators 210a-1 and 210a-2 of the first sound generating device 200-1 can vibrate based on the first vibration driving signal, and the first vehicle vibration region corresponding to the first sound space SS1 can vibrate based on vibrations of the vibration generators 210a-1 and 210a-2, whereby the first sound S1 can be provided to the first sound space SS1 based on a vibration of the first vehicle vibration region.

According to an embodiment of the present disclosure, the second sound generating device 200-2 can be disposed at a second sound space SS2 within a second enclosure 100-2 and can vibrate a second vehicle vibration region (or a second vibration region) corresponding to the second sound space SS2 based on a second vibration driving signal (or a second sound signal) from the sound processing circuit 310 to provide a second sound S2 to the second sound space SS2. For example, vibration generators 210b-1 and 210b-2 of the second sound generating device 200-2 can vibrate based on the second vibration driving signal, and the second vehicle vibration region corresponding to the second sound space SS2 can vibrate based on vibrations of the vibration generators 210b-1 and 210b-2, whereby the second sound S2 can be provided to the second sound space SS2 based on a vibration of the second vehicle vibration region.

According to an embodiment of the present disclosure, the third sound generating device 200-3 can be disposed at a third sound space SS3 within a third enclosure 100-3 and can vibrate a third vehicle vibration region (or a third vibration region) corresponding to the third sound space SS3 based on a third vibration driving signal (or a third sound signal) from the sound processing circuit 310 to provide a third sound S3 to the third sound space SS3. For example, vibration generators 210c-1 and 210c-2 of the third sound generating device 200-3 can vibrate based on the third vibration driving signal, and the third vehicle vibration region corresponding to the third sound space SS3 can vibrate based on vibrations of the vibration generators 210c-1 and 210c-2, whereby the third sound S3 can be provided to the third sound space SS3 based on a vibration of the third vehicle vibration region.

According to an embodiment of the present disclosure, the fourth sound generating device 200-4 can be disposed at a fourth sound space SS4 within a fourth enclosure 100-4 and can vibrate a fourth vehicle vibration region (or a fourth vibration region) corresponding to the fourth sound space SS4 based on a fourth vibration driving signal (or a fourth sound signal) from the sound processing circuit 310 to provide a fourth sound S4 to the fourth sound space SS4. For example, vibration generators 210d-1 and 210d-2 of the fourth sound generating device 200-4 can vibrate based on the fourth vibration driving signal, and the fourth vehicle vibration region corresponding to the fourth sound space SS4 can vibrate based on vibrations of the vibration generators 210d-1 and 210d-2, whereby the fourth sound S4 can be provided to the fourth sound space SS4 based on a vibration of the fourth vehicle vibration region.

The sound processing circuit 310 according to an embodiment of the present disclosure can receive a sound source signal corresponding to a sound source, generate the vibration driving signal (or the sound signal) based on the sound source signal, and output the vibration driving signal to the sound generating device 200.

According to an embodiment of the present disclosure, the sound processing circuit 310 can receive the sound source signal from a sound source supply system 10. For example, the sound source supply system 10 can be a vehicle safety system such as a navigation system, an audio system, or a multimedia system installed in a vehicle, but embodiments of the present disclosure are not limited thereto.

According to an embodiment of the present disclosure, the sound processing circuit 310 can receive a noise removal signal from the noise processing circuit 320 and can generate the vibration driving signal based on the sound source signal and the noise removal signal. For example, the sound processing circuit 310 can combine the sound source signal with the noise removal signal to generate the vibration driving signal.

As described above, when the sound processing circuit 310 vibrates the sound generating device 200 based on the vibration driving signal including the noise removal signal to provide the sound, a sound corresponding to the noise removal signal can be included in the provided sound, and thus, noise can be offset by the sound corresponding to the noise removal signal.

According to an embodiment of the present disclosure, the sound processing circuit 310 can receive first to fourth noise removal signals from the noise processing circuit 320 and can generate first to fourth vibration driving signals based on the sound source signal and the first to fourth noise removal signals.

According to an embodiment of the present disclosure, the sound processing circuit 310 can generate the first vibration driving signal based on the sound source signal and the first noise removal signal and can provide the first vibration driving signal to the first sound generating device 200-1. For example, the sound processing circuit 310 can generate the second vibration driving signal based on the sound source signal and the second noise removal signal and can provide the second vibration driving signal to the second sound generating device 200-2. For example, the sound processing circuit 310 can generate the third vibration driving signal based on the sound source signal and the third noise removal signal and can provide the third vibration driving signal to the third sound generating device 200-3. For example, the sound processing circuit 310 can generate the fourth vibration driving signal based on the sound source signal and the fourth noise removal signal and can provide the fourth vibration driving signal to the fourth sound generating device 200-4.

The noise processing circuit 320 according to an embodiment of the present disclosure can receive a noise signal from a microphone array 220 of the sound generating device 200. For example, the noise processing circuit 320 can receive the noise signal from each of a plurality of microphones 221 of the microphone array 220. For example, the noise processing circuit 320 can receive the noise signal from a first microphone group of the microphone array 220. The noise processing circuit 320 can generate the noise removal signal based on the received noise signal and can provide the generated noise removal signal to the sound processing circuit 310. For example, the noise processing circuit 320 can generate the noise removal signal having a phase opposite to that of the noise signal.

According to an embodiment of the present disclosure, the noise processing circuit 320 can receive the noise signal (first to fourth noises) from microphone arrays (first to fourth microphone arrays) 220a to 220d of each of the first to fourth sound generating devices 200-1 to 200-4 and can generate the noise removal signal corresponding to each of the first to fourth noise signals. For example, the noise processing circuit 320 can receive the noise signal from a plurality of microphones of each of the first to fourth microphone arrays 220a to 220d. For example, the first noise can be noise within the first sound space SS1, the second noise can be noise within the second sound space SS2, the third noise can be noise within the third sound space SS3, and the fourth noise can be noise within the fourth sound space SS4.

According to an embodiment of the present disclosure, the noise processing circuit 320 can generate the first noise removal signal based on the first noise signal from the first microphone array 220a of the first sound generating device 200-1. For example, the noise processing circuit 320 can receive the noise signal from a plurality of microphones 221a of the first microphone array 220a of the first sound generating device 200-1 and can generate the first noise removal signal based on the noise signal from the plurality of microphones 221a of the first microphone array 220a. For example, the noise processing circuit 320 can generate the second noise removal signal based on the second noise signal from the second microphone array 220b of the second sound generating device 200-2. For example, the noise processing circuit 320 can receive the noise signal from a plurality of microphones 221b of the second microphone array 220b of the second sound generating device 200-2 and can generate the second noise removal signal based on the noise signal from the plurality of microphones 221b of the second microphone array 220b.

According to an embodiment of the present disclosure, the noise processing circuit 320 can generate the third noise removal signal based on the third noise signal from the third microphone array 220c of the third sound generating device 200-3. For example, the noise processing circuit 320 can receive the noise signal from a plurality of microphones 221c of the third microphone array 220c of the third sound generating device 200-3 and can generate the third noise removal signal based on the noise signal from the plurality of microphones 221c of the third microphone array 220c. For example, the noise processing circuit 320 can generate the fourth noise removal signal based on the fourth noise signal from the fourth microphone array 220d of the fourth sound generating device 200-4. For example, the noise processing circuit 320 can receive the noise signal from a plurality of microphones 221d of the fourth microphone array 220d of the fourth sound generating device 200-4 and can generate the fourth noise removal signal based on the noise signal from the plurality of microphones 221d of the fourth microphone array 220d.

According to an embodiment of the present disclosure, the noise processing circuit 320 can measure a magnitude of noise based on the noise signal from the microphone array 220 of the sound generating device 200 and can provide a measurement result to the beamforming control device 330. For example, the noise processing circuit 320 can receive the noise signal from a second microphone group of the microphone array 220.

The beamforming control device 330 according to an embodiment of the present disclosure can perform beamforming control on the microphone array 220 of the sound generating device 200. For example, the beamforming control device 330 can perform beamforming control on the microphone array 220 of the sound generating device 200 based on a noise magnitude measurement result from the noise processing circuit 320. For example, the beamforming control device 330 can perform beamforming control on each of the plurality of microphones 221 of the microphone array 220 of the sound generating device 200.

According to an embodiment of the present disclosure, the beamforming control device 330 can perform beamforming control on the microphone arrays 220a to 220d of each of the first to fourth sound generating devices 200-1 to 200-4. For example, the beamforming control device 330 can include first to fourth beamforming control devices 330-1 to 330-4.

According to an embodiment of the present disclosure, the first beamforming control device 330-1 can perform beamforming control on the first microphone array 220a of the first sound generating device 200-1. For example, the second beamforming control device 330-2 can perform beamforming control on the second microphone array 220b of the second sound generating device 200-2. For example, the third beamforming control device 330-3 can perform beamforming control on the third microphone array 220c of the third sound generating device 200-3. For example, the fourth beamforming control device 330-4 can perform beamforming control on the fourth microphone array 220d of the fourth sound generating device 200-4.

The amplification circuit part 340 according to an embodiment of the present disclosure can be disposed between the sound processing circuit 310 and the sound generating device 200. For example, the amplification circuit part 340 can receive and amplify the vibration driving signal output from the sound processing circuit 310 and can provide the amplified vibration driving signal to the sound generating device 200. For example, the amplification circuit part 340 can be disposed at a signal path (or a line or a wire) between the sound processing circuit 310 and the sound generating device 200. For example, the amplification circuit part 340 can also be disposed in the sound processing circuit 310, or can also be disposed in the sound generating device 200.

According to an embodiment of the present disclosure, the amplification circuit part 340 can include first to fourth amplification circuits 340-1 to 340-4.

According to an embodiment of the present disclosure, the first amplification circuit 340-1 can be disposed between the sound processing circuit 310 and the first sound generating device 200-1. For example, the first amplification circuit 340-1 can receive and amplify a first vibration driving signal output from the sound processing circuit 310 and can provide the amplified first vibration driving signal to the first sound generating device 200-1. For example, the first amplification circuit 340-1 can be disposed at a first signal path (or a first line) between the sound processing circuit 310 and the first sound generating device 200-1. For example, the first amplification circuit 340-1 can also be disposed in the sound processing circuit 310, or can also be disposed in the first sound generating device 200-1.

According to an embodiment of the present disclosure, the second amplification circuit 340-2 can be disposed between the sound processing circuit 310 and the second sound generating device 200-2. For example, the second amplification circuit 340-2 can receive and amplify a second vibration driving signal output from the sound processing circuit 310 and can provide the amplified second vibration driving signal to the second sound generating device 200-2. For example, the second amplification circuit 340-2 can be disposed at a second signal path (or a second line) between the sound processing circuit 310 and the second sound generating device 200-2. For example, the second amplification circuit 340-2 can also be disposed in the sound processing circuit 310, or can also be disposed in the second sound generating device 200-2.

According to an embodiment of the present disclosure, the third amplification circuit 340-3 can be disposed between the sound processing circuit 310 and the third sound generating device 200-3. For example, the third amplification circuit 340-3 can receive and amplify a third vibration driving signal output from the sound processing circuit 310 and can provide the amplified third vibration driving signal to the third sound generating device 200-3. For example, the third amplification circuit 340-3 can be disposed at a third signal path (or a third line) between the sound processing circuit 310 and the third sound generating device 200-3. For example, the third amplification circuit 340-3 can also be disposed in the sound processing circuit 310, or can also be disposed in the third sound generating device 200-3.

According to an embodiment of the present disclosure, the fourth amplification circuit 340-4 can be disposed between the sound processing circuit 310 and the fourth sound generating device 200-4. For example, the fourth amplification circuit 340-4 can receive and amplify a fourth vibration driving signal output from the sound processing circuit 310 and can provide the amplified fourth vibration driving signal to the fourth sound generating device 200-4. For example, the fourth amplification circuit 340-4 can be disposed at a fourth signal path (or a fourth line) between the sound processing circuit 310 and the fourth sound generating device 200-4. For example, the fourth amplification circuit 340-4 can also be disposed in the sound processing circuit 310, or can also be disposed in the fourth sound generating device 200-4.

Figure 20:
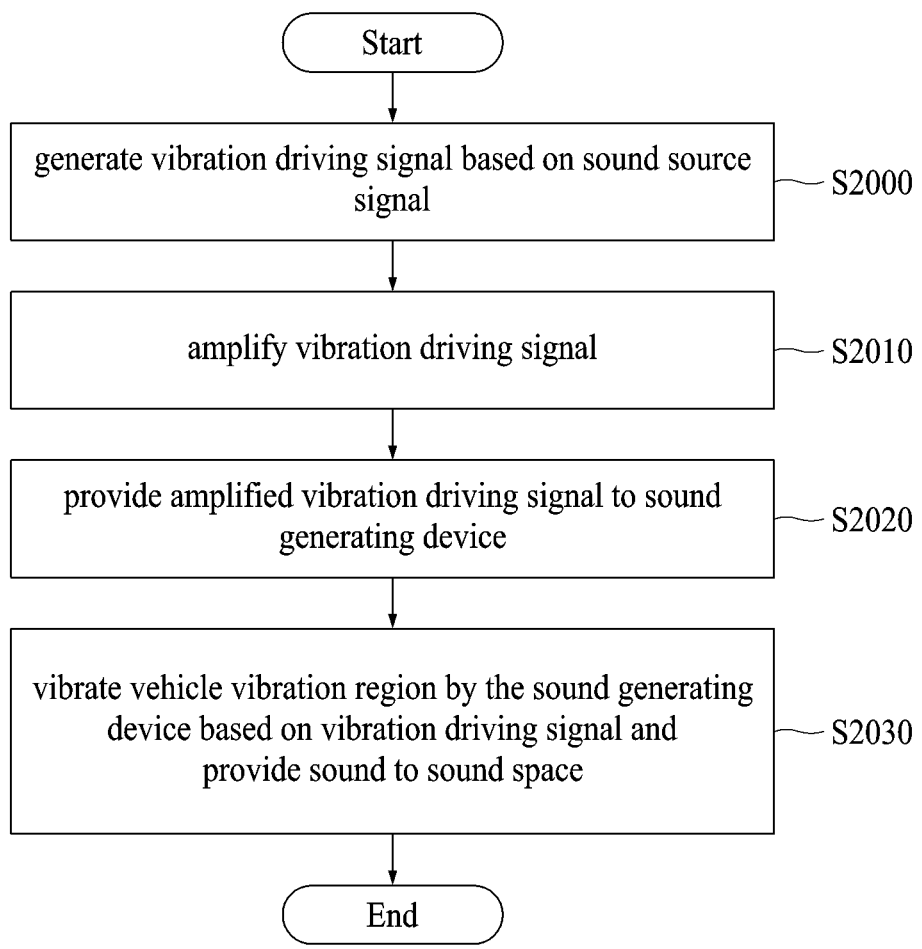
FIG. 20 is a flowchart illustrating an operation of a sound control system for vehicles according to an embodiment of the present disclosure.

FIG. 20 is a flowchart illustrating an operation of a sound control system for vehicles according to an embodiment of the present disclosure.

With reference to FIGS. 1, 2, 19, and 20, the sound processing circuit 310 can be provided with a sound source signal from the sound source supply system 10 and can generate a vibration driving signal based on the sound source signal in step S2000. The vibration driving signal, which is generated by the sound processing circuit 310 in step S2000, can be output to the sound generating device 200.

In step S2000, the sound processing circuit 310 can generate a first vibration driving signal for the first sound generating device 200-1 disposed at the first sound space SS1, which is formed to correspond to the front left region FL, a second vibration driving signal for the second sound generating device 200-2 disposed at the second sound space SS2, which is formed to correspond to the front right region FR, a third vibration driving signal for the third sound generating device 200-3 disposed at the third sound space SS3, which is formed to correspond to the rear left region RL, and a fourth vibration driving signal for the fourth sound generating device 200-4 disposed at the fourth sound space SS4, which is formed to correspond to the rear right region RR.

As described above, the sound processing circuit 310 can generate the first to fourth vibration driving signals for the first to fourth sound generating devices 200-1, 200-2, 200-3, and 200-4 respectively disposed at the first to fourth sound spaces SS1, SS2, SS3, and SS4 formed for each seat of a vehicle, and thus, the independent sounds S1, S2, S3, and S4 can be provided for each seat of the vehicle.

Before the vibration driving signal generated in step S2000 is input to the sound generating device 200, the amplification circuit part 340 can amplify the vibration driving signal in step S2010.

In step S2010, the amplification circuit part 340 can receive and amplify the vibration driving signal output from the sound processing circuit 310 and can provide an amplified vibration driving signal to the sound generating device 200 in step S2020.

According to an embodiment of the present disclosure, the first amplification circuit 340-1 can receive and amplify a first vibration driving signal output from the sound processing circuit 310 and can provide the amplified first vibration driving signal to the first sound generating device 200-1. For example, the second amplification circuit 340-2 can receive and amplify a second vibration driving signal output from the sound processing circuit 310 and can provide the amplified second vibration driving signal to the second sound generating device 200-2. For example, the third amplification circuit 340-3 can receive and amplify a third vibration driving signal output from the sound processing circuit 310 and can provide the amplified third vibration driving signal to the third sound generating device 200-3. For example, the fourth amplification circuit 340-4 can receive and amplify a fourth vibration driving signal output from the sound processing circuit 310 and can provide the amplified fourth vibration driving signal to the fourth sound generating device 200-4.

After step S2020, the sound generating device 200 can vibrate a vehicle vibration region based on the vibration driving signal to provide the sound to the sound space SS (step S2030). For example, the vibration generator 210 of the sound generating device 200 can vibrate based on the vibration driving signal, and a vehicle vibration region corresponding to the sound space SS can vibrate based on a vibration of the vibration generator 210, whereby the sound can be provided to the sound space SS based on a vibration of the vehicle vibration region.

In step S2030, the first sound generating device 200-1 can vibrate a first vehicle vibration region based on the first vibration driving signal to provide the first sound S1 to the first sound space SS1. For example, the vibration generators 210*a*-1 and 210*a*-2 of the first sound generating device 200-1 can vibrate based on the first vibration driving signal, and the first vehicle vibration region corresponding to the first sound space SS1 can vibrate based on vibrations of the vibration generators 210*a*-1 and 210*a*-2, whereby the first sound S1 can be provided to the first sound space SS1 based on a vibration of the first vehicle vibration region.

In step S2030, the second sound generating device 200-2 can vibrate a second vehicle vibration region based on the second vibration driving signal to provide the second sound S2 to the second sound space SS2. For example, the vibration generators 210*b*-1 and 210*b*-2 of the second sound generating device 200-2 can vibrate based on the second vibration driving signal, and the second vehicle vibration region corresponding to the second sound space SS2 can vibrate based on vibrations of the vibration generators 210*b*-1 and 210*b*-2, whereby the second sound S2 can be provided to the second sound space SS2 based on a vibration of the second vehicle vibration region.

In step S2030, the third sound generating device 200-3 can vibrate a third vehicle vibration region based on the third vibration driving signal to provide the third sound S3 to the third sound space SS3. For example, the vibration generators 210*c*-1 and 210*c*-2 of the third sound generating device 200-3 can vibrate based on the third vibration driving signal, and the third vehicle vibration region corresponding to the third sound space SS3 can vibrate based on vibrations of the vibration generators 210*c*-1 and 210*c*-2, whereby the third sound S3 can be provided to the third sound space SS3 based on a vibration of the third vehicle vibration region.

In step S2030, the fourth sound generating device 200-4 can vibrate a fourth vehicle vibration region based on the fourth vibration driving signal to provide the fourth sound S4 to the fourth sound space SS4. For example, the vibration generators 210*d*-1 and 210*d*-2 of the fourth sound generating device 200-4 can vibrate based on the fourth vibration driving signal, and the fourth vehicle vibration region corresponding to the fourth sound space SS4 can vibrate based on vibrations of the vibration generators 210*d*-1 and 210*d*-2, whereby the fourth sound S4 can be provided to the fourth sound space SS4 based on a vibration of the fourth vehicle vibration region.

As described above, the sound control system for vehicles according to an embodiment of the present disclosure can drive the first to fourth sound generating devices 200-1 to 200-4 respectively disposed at the first to fourth sound spaces SS1 to SS4 formed for each seat of a vehicle, and thus, the independent sounds S1 to S4 can be provided for each seat of the vehicle.

Figure 21:
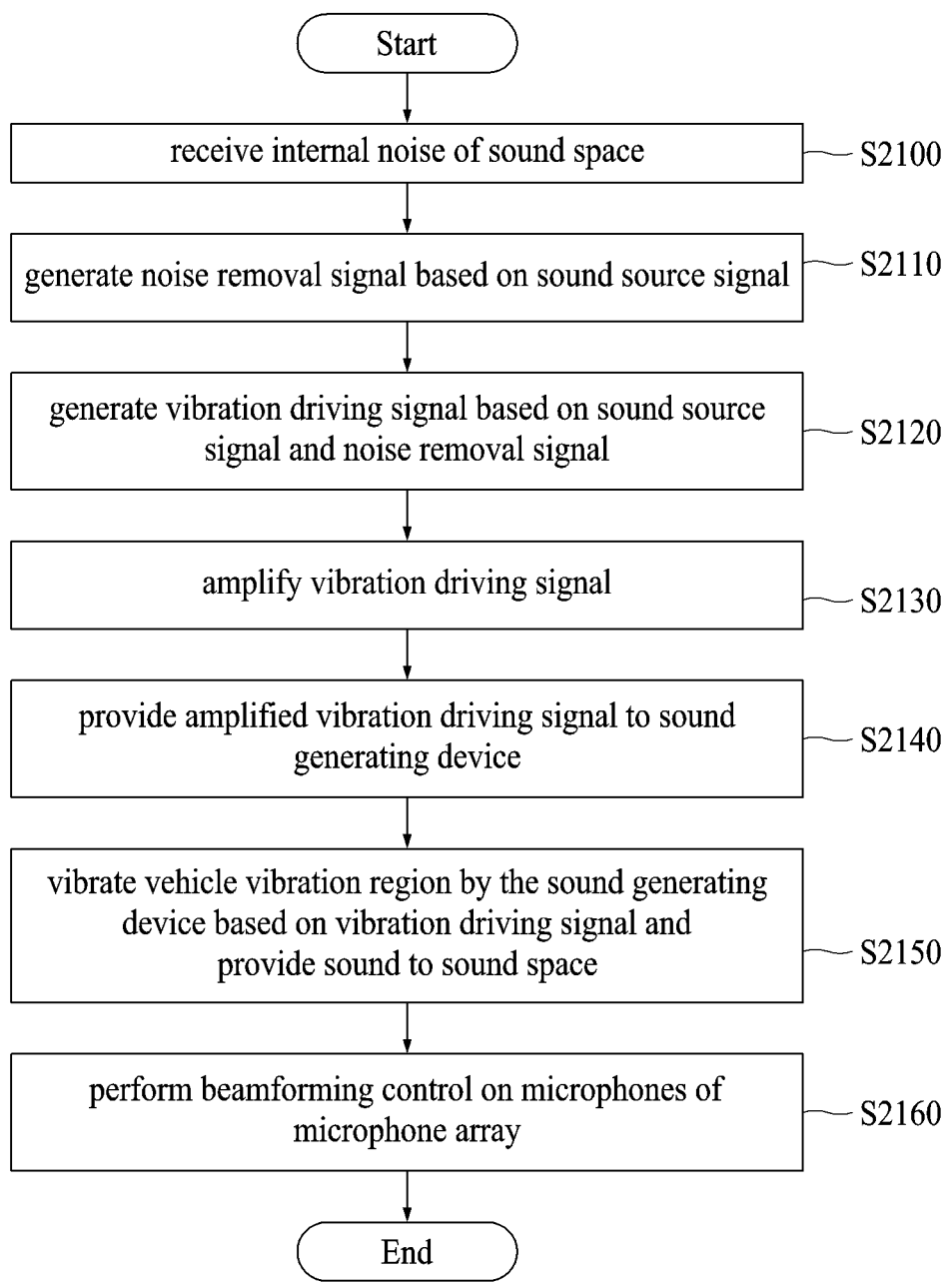
FIG. 21 is another flowchart illustrating an operation of a sound control system for vehicles according to an embodiment of the present disclosure.

FIG. 21 is a flowchart illustrating an operation of a sound control system for vehicles according to an embodiment of the present disclosure.

With reference to FIGS. 1, 2, 19, and 21, in step S2100, the microphone array 220 of the sound generating device 200 can receive noise of the sound space SS. For example, a microphone designated as a first microphone ground among the plurality of microphones 221 of the microphone array 220 can receive the noise of the sound space SS. The noise received by the microphone array 220 in step S2100 can be converted into an electrical signal and can be provided to the noise processing circuit 320. For example, the plurality of microphones 221 of the microphone array 200 can convert the received noise into an electrical signal to provide a noise signal to the noise processing circuit 320.

According to an embodiment of the present disclosure, the plurality of microphones 221*a* of the first microphone array 220*a* of the first sound generating device 200-1 can receive a first noise of the first sound space SS1 and can provide a first noise signal, corresponding to the first noise, to the noise processing circuit 320. For example, the plurality of microphones 221*b* of the second microphone array 220*b* of the second sound generating device 200-2 can receive a second noise of the second sound space SS2 and can provide a second noise signal, corresponding to the second noise, to the noise processing circuit 320.

According to an embodiment of the present disclosure, the plurality of microphones 221*c* of the third microphone array 220*c* of the third sound generating device 200-3 can receive a third noise of the third sound space SS3 and can provide a third noise signal, corresponding to the third noise, to the noise processing circuit 320. For example, the plurality of microphones 221*d* of the fourth microphone array 220*d* of the fourth sound generating device 200-4 can receive a fourth noise of the fourth sound space SS4 and can provide a fourth noise signal, corresponding to the fourth noise, to the noise processing circuit 320.

After step S2100, the noise processing circuit 320 can generate a noise removal signal based on the noise signal from the microphone array 220 of the sound generating device 200 in step S2110. The noise removal signal, generated by the noise processing circuit 320 in step S2110, can be provided to the sound processing circuit 310.

In step S2110, the noise processing circuit 320 can receive the noise signal from the plurality of microphones 221 of the microphone array 220 of the sound generating device 200 and can generate the noise removal signal based on the received noise signal.

In step S2110, the noise processing circuit 320 can receive the noise signal (first to fourth noises) from the microphone arrays (first to fourth microphone arrays) 220*a* to 220*d* of each of the first to fourth sound generating devices 200-1 to 200-4 and can generate the noise removal signal corresponding to each of the first to fourth noise signals.

According to an embodiment of the present disclosure, the noise processing circuit 320 can receive the noise signal from a plurality of microphones of each of the first to fourth microphone arrays 220*a* to 220*d*. For example, the first noise can be a noise in the first sound space SS1, the second noise can be a noise in the second sound space SS2, the third noise can be a noise in the third sound space SS3, and the fourth noise can be a noise in the fourth sound space SS4.

In step S2110, the noise processing circuit 320 can receive the noise signal from the plurality of microphones 221*a* of the first microphone array 220*a* of the first sound generating device 200-1 and can generate the first noise removal signal based on the noise signal from the plurality of microphones 221*a* of the first microphone array 220*a*.

In step S2110, the noise processing circuit 320 can receive the noise signal from the plurality of microphones 221*b* of the second microphone array 220*b* of the second sound generating device 200-2 and can generate the second noise removal signal based on the noise signal from the plurality of microphones 221*b* of the second microphone array 220*b*.

In step S2110, the noise processing circuit 320 can receive the noise signal from the plurality of microphones 221*c* of the third microphone array 220*c* of the third sound generating device 200-3 and can generate the third noise removal signal based on the noise signal from the plurality of microphones 221*c* of the third microphone array 220*c*.

In step S2110, the noise processing circuit 320 can receive the noise signal from the plurality of microphones 221*d* of the fourth microphone array 220*d* of the fourth sound generating device 200-4 and can generate the fourth noise removal signal based on the noise signal from the plurality of microphones 221*d* of the fourth microphone array 220*d*.

After step S2110, the sound processing circuit 310 can generate a vibration driving signal based on a sound source signal from the sound source supply system 10 and a noise removal signal from the noise processing circuit 320 in step S2120. The vibration driving signal, generated in step S2120, can be output to the sound generating device 200.

In step S2120, the sound processing circuit 310 can generate a first vibration driving signal for the first sound generating device 200-1 disposed at the first sound space SS1 which is formed to correspond to the front left region (or a driver region) FL, a second vibration driving signal for the second sound generating device 200-2 disposed at the second sound space SS2 which is formed to correspond to the front right region (or a passenger region) FR, a third vibration driving signal for the third sound generating device 200-3 disposed at the third sound space SS3 which is formed to correspond to the rear left region RL, and a fourth vibration driving signal for the fourth sound generating device 200-4 disposed at the fourth sound space SS4 which is formed to correspond to the rear right region RR.

As described above, the sound processing circuit 310 can generate the first to fourth vibration driving signals for the first to fourth sound generating devices 200-1 to 200-4 respectively disposed at the first to fourth sound spaces SS1 to SS4 formed for each seat of a vehicle, respectively, and thus, the independent sounds S1 to S4 can be provided for each seat of the vehicle.

In step S2130, before the vibration driving signal generated in step S2120 is input to the sound generating device 200, the amplification circuit part 340 can amplify the vibration driving signal (step S2130).

In step S2130, the amplification circuit part 340 can receive and amplify the vibration driving signal output from the sound processing circuit 310 and can provide the amplified vibration driving signal to the sound generating device 200 in step S2140.

According to an embodiment of the present disclosure, the first amplification circuit 340-1 can receive and amplify a first vibration driving signal output from the sound processing circuit 310 and can provide the amplified first vibration driving signal to the first sound generating device 200-1. For example, the second amplification circuit 340-2 can receive and amplify a second vibration driving signal output from the sound processing circuit 310 and can provide the amplified second vibration driving signal to the second sound generating device 200-2. For example, the third amplification circuit 340-3 can receive and amplify a third vibration driving signal output from the sound processing circuit 310 and can provide the amplified third vibration driving signal to the third sound generating device 200-3. For example, the fourth amplification circuit 340-4 can receive and amplify a fourth vibration driving signal output from the sound processing circuit 310 and can provide the amplified fourth vibration driving signal to the fourth sound generating device 200-4.

After step S2140, the sound generating device 200 can vibrate a vehicle vibration region based on the vibration driving signal to provide the sound to the sound space SS in step S2150. For example, the vibration generator 210 of the sound generating device 200 can vibrate based on the vibration driving signal, and a vehicle vibration region corresponding to the sound space SS can vibrate based on a vibration of the vibration generator 210, whereby the sound can be provided to the sound space SS based on a vibration of the vehicle vibration region.

In step S2150, the first sound generating device 200-1 can vibrate a first vehicle vibration region based on the first vibration driving signal to provide the first sound S1 to the first sound space SS1. For example, the vibration generators 210a-1 and 210a-2 of the first sound generating device 200-1 can vibrate based on the first vibration driving signal, and the first vehicle vibration region corresponding to the first sound space SS1 can vibrate based on vibrations of the vibration generators 210a-1 and 210a-2, whereby the first sound S1 can be provided to the first sound space SS1 based on a vibration of the first vehicle vibration region.

In step S2150, the second sound generating device 200-2 can vibrate a second vehicle vibration region based on the second vibration driving signal to provide the second sound S2 to the second sound space SS2. For example, the vibration generators 210b-1 and 210b-2 of the second sound generating device 200-2 can vibrate based on the second vibration driving signal, and the second vehicle vibration region corresponding to the second sound space SS2 can vibrate based on vibrations of the vibration generators 210b-1 and 210b-2, whereby the second sound S2 can be provided to the second sound space SS2 based on a vibration of the second vehicle vibration region.

In step S2150, the third sound generating device 200-3 can vibrate a third vehicle vibration region based on the third vibration driving signal to provide the third sound S3 to the third sound space SS3. For example, the vibration generators 210c-1 and 210c-2 of the third sound generating device 200-3 can vibrate based on the third vibration driving signal, and the third vehicle vibration region corresponding to the third sound space SS3 can vibrate based on vibrations of the vibration generators 210c-1 and 210c-2, whereby the third sound S3 can be provided to the third sound space SS3 based on a vibration of the third vehicle vibration region.

In step S2150, the fourth sound generating device 200-4 can vibrate a fourth vehicle vibration region based on the fourth vibration driving signal to provide the fourth sound S4 to the fourth sound space SS4. For example, the vibration generators 210d-1 and 210d-2 of the fourth sound generating device 200-4 can vibrate based on the fourth vibration driving signal, and the fourth vehicle vibration region corresponding to the fourth sound space SS4 can vibrate based on vibrations of the vibration generators 210d-1 and 210d-2, whereby the fourth sound S4 can be provided to the fourth sound space SS4 based on a vibration of the fourth vehicle vibration region.

As described above, the sound control system for vehicles according to an embodiment of the present disclosure can drive the first to fourth sound generating devices 200-1 to 200-4 respectively disposed at the first to fourth sound spaces SS1 to SS4 formed for each seat of a vehicle, and thus, the independent sounds S1 to S4 can be provided for each seat of the vehicle.

Moreover, the sound control system for vehicles according to an embodiment of the present disclosure can vibrate the sound generating device 200 based on the vibration driving signal including the noise removal signal to provide the sound, and thus, noise can be offset by the sound corresponding to the noise removal signal.

After step S2150, beamforming control can be performed on the plurality of microphones 221a to 221d of the microphone arrays 220a to 220d of each of the first to fourth sound generating devices 200-1 to 200-4 in step S2160.

According to an embodiment of the present disclosure, a microphone designated as a second microphone group among the plurality of microphones 221 of the microphone array 220 can receive noise of the sound space SS and can provide the received noise to the noise processing circuit 320, the noise processing circuit 320 can provide the beamforming control device 330 with a magnitude measurement result of the provided noise, and the beamforming control device 330 can perform beamforming control on the plurality of microphones 221a to 221d of the microphone arrays 220a to 220d of each of the first to fourth sound generating devices 200-1 to 200-4 based on the measurement result of the noise magnitude.

Figure 22:
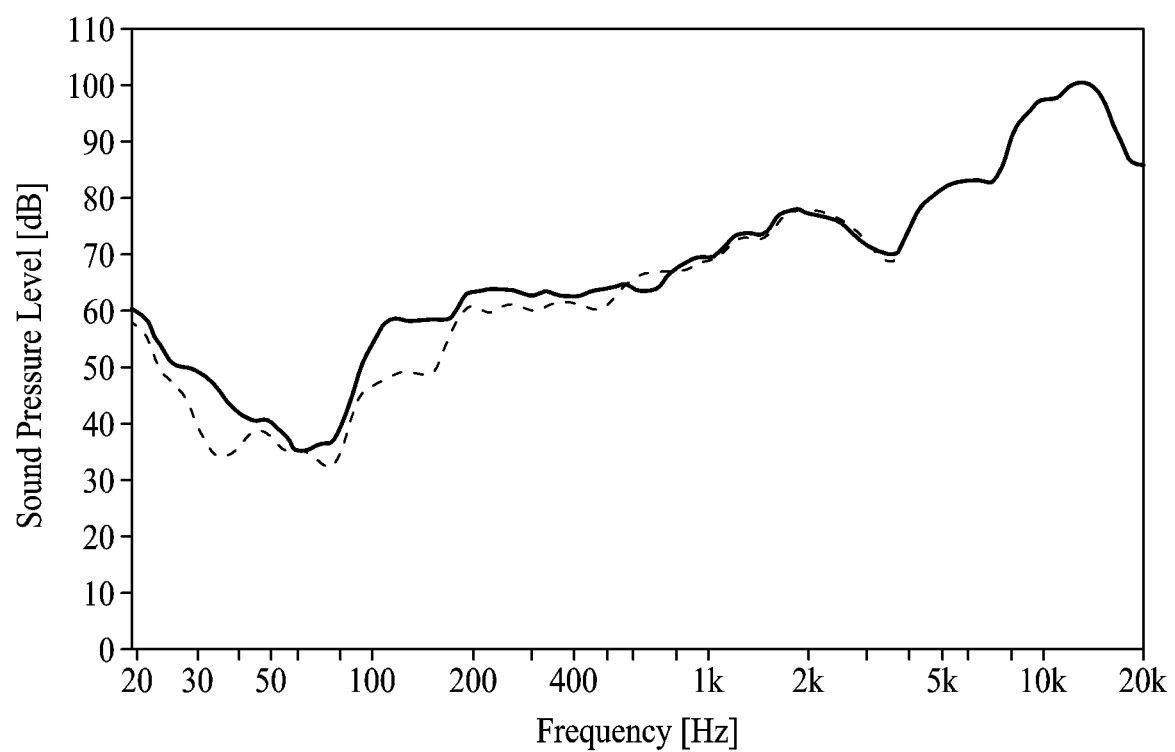
FIG. 22 is a graph showing a sound pressure level characteristic before and after including a plate according to an embodiment of the present disclosure is applied.

FIG. 22 is a graph illustrating a sound pressure level characteristic before and after including a plate according to an embodiment of the present disclosure is applied. In FIG. 22, the abscissa axis represents a frequency (Hz), and the ordinate axis represents a sound pressure level (dB). In FIG. 22, a dotted line represents a sound pressure level characteristic measured by a sound generating device which does not include the plate, and a solid line represents a sound pressure level characteristic measured by a sound generating device including the plate 212.

With reference to FIG. 22, in a low frequency band of about 100 Hz to about 200 Hz, it can be seen that a sound pressure level (a solid line) measured by a sound generating device including the plate is higher than a sound pressure level (a dotted line) measured by a sound generating device which does not include the plate. Accordingly, as in an embodiment of the present disclosure, when the plate is provided in a sound generating device, a sound pressure level characteristic and a sound characteristic of a low-pitched sound band can be enhanced.

Figure 23:
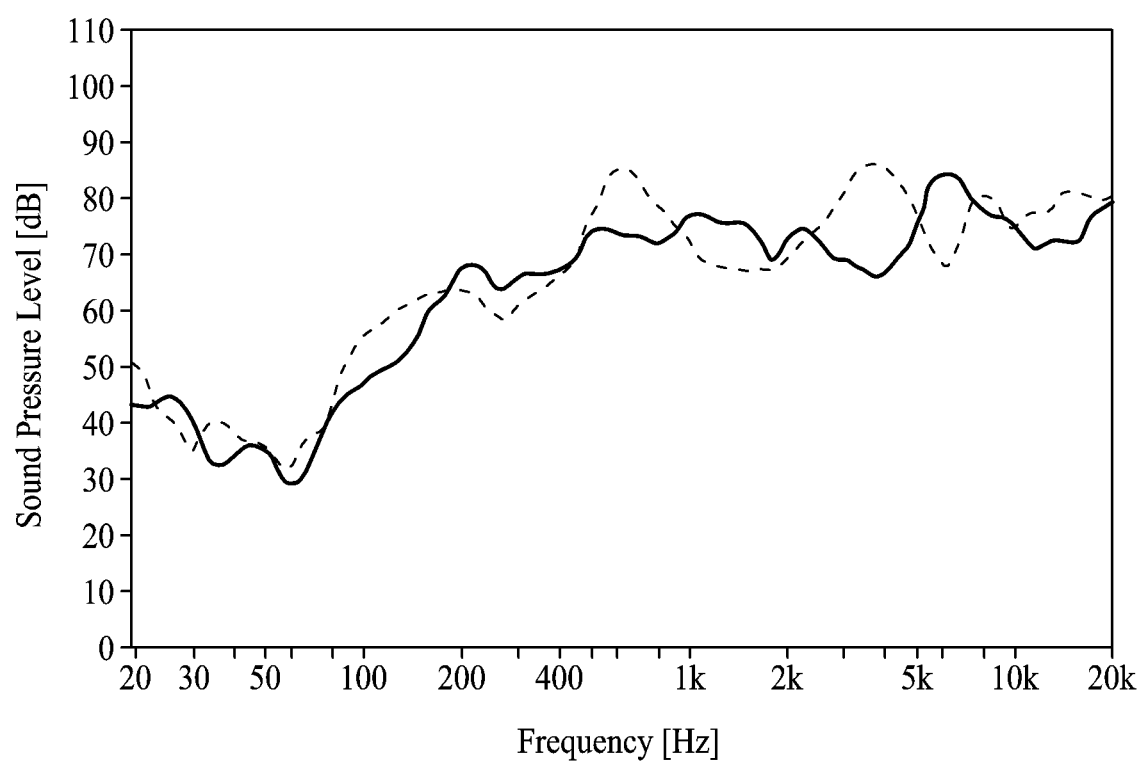
FIG. 23 is a graph showing a sound pressure level characteristic before and after a corner-rounded frame according to an embodiment of the present disclosure is applied.

FIG. 23 is a graph illustrating a sound pressure level characteristic before and after a corner-rounded frame according to an embodiment of the present disclosure is applied. In FIG. 23, the abscissa axis represents a frequency (Hz), and the ordinate axis represents a sound pressure level (dB). In FIG. 23, a dotted line represents a sound pressure level characteristic measured by a sound generating device including a frame where corners thereof are not rounded, and a solid line represents a sound pressure level characteristic measured by a sound generating device including the corner-rounded frame.

With reference to FIG. 23, in a low frequency band of about 200 Hz to about 20 kHz, it can be seen that a variation amount of a vibration amplitude of a sound pressure level (a solid line) measured by a sound generating device including the corner-rounded frame is lower than a variation amount of a vibration amplitude of a sound pressure level (a dotted line) measured by a sound generating device including a frame where corners thereof are not rounded. Accordingly, as in an embodiment of the present disclosure, when corners of a frame configured to support a vibration generator is rounded, the flatness of a sound characteristic can be enhanced. Here, the flatness of a sound characteristic can be a magnitude of a deviation between a highest sound pressure level and a lowest sound pressure level.

Figure 24:
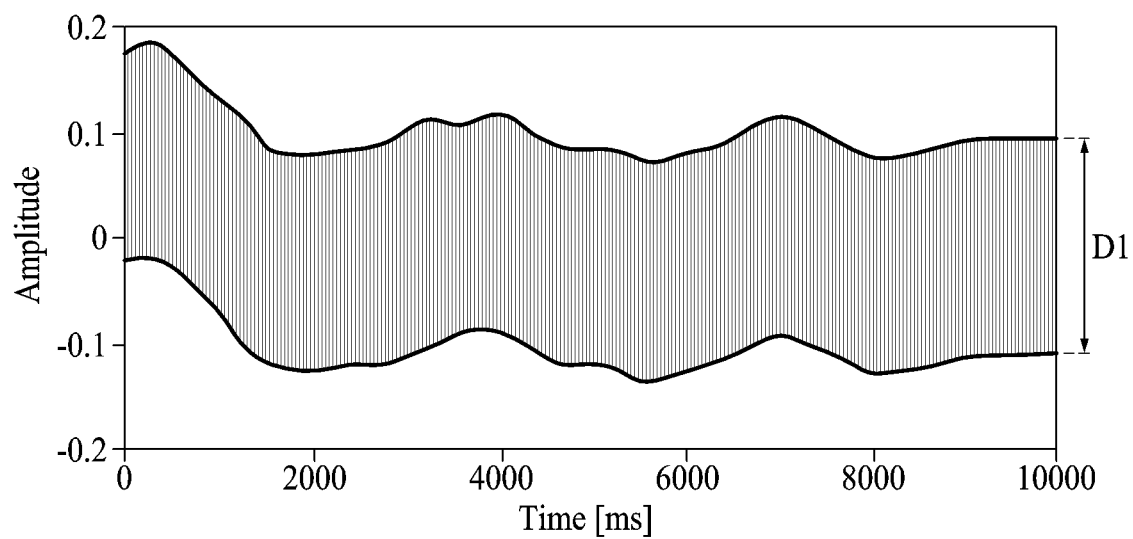
FIG. 24 is a graph showing an amplitude of residual noise before a noise removal algorithm according to an embodiment of the present disclosure is applied.
Figure 25:
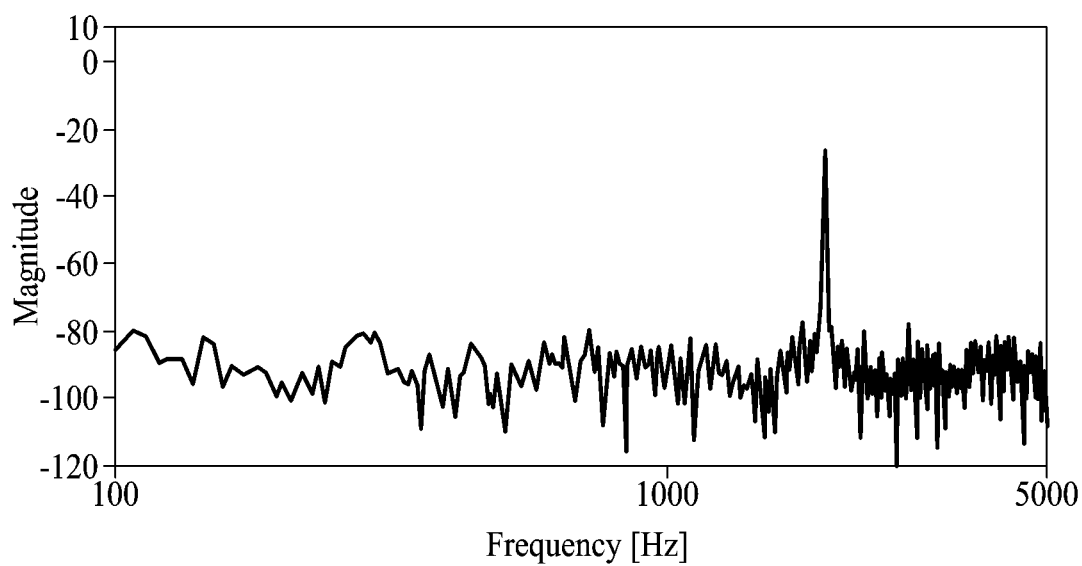
FIG. 25 is a graph showing a magnitude of residual noise before the noise removal algorithm according to an embodiment of the present disclosure is applied.
Figure 26:
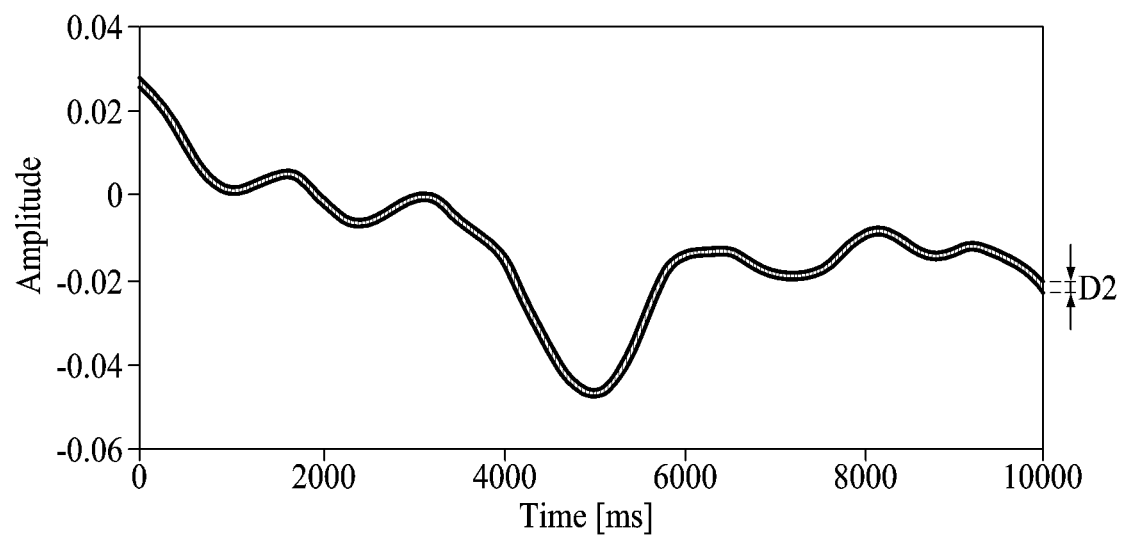
FIG. 26 is a graph showing an amplitude of residual noise after the noise removal algorithm according to an embodiment of the present disclosure is applied.
Figure 27:
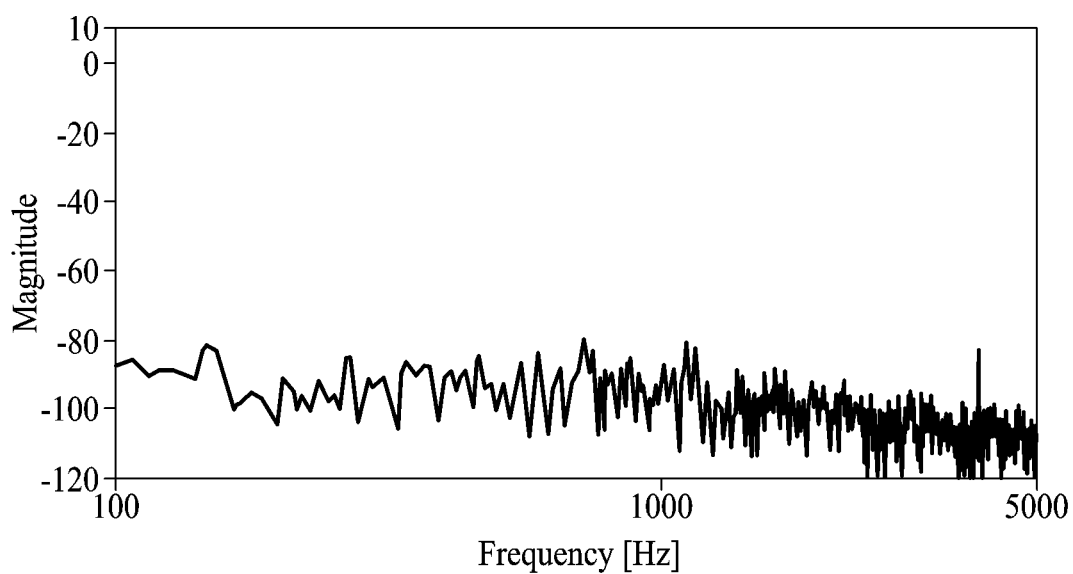
FIG. 27 is a graph showing a magnitude of residual noise after the noise removal algorithm according to an embodiment of the present disclosure is applied.

FIG. 24 is a graph illustrating an amplitude of residual noise before a noise removal algorithm according to an embodiment of the present disclosure is applied. FIG. 25 is a graph illustrating a magnitude of residual noise before the noise removal algorithm according to an embodiment of the present disclosure is applied. FIG. 26 is a graph illustrating an amplitude of residual noise after the noise removal algorithm according to an embodiment of the present disclosure is applied. FIG. 27 is a graph illustrating a magnitude of residual noise after the noise removal algorithm according to an embodiment of the present disclosure is applied.

In FIGS. 24 and 26, the abscissa axis represents a time (s), and the ordinate axis represents an amplitude of residual noise. In FIGS. 25 and 27, the abscissa axis represents a frequency (Hz), and the ordinate axis represents a magnitude of residual noise. FIGS. 24 and 26 show residual noise with respect to a time domain, and FIGS. 25 and 27 show residual noises of FIGS. 24 and 26 with respect to a time domain, respectively.

With reference to FIGS. 24 and 26, in a total frequency band of a measurement range, it can be seen that an amplitude D2 of noise in a case (FIG. 26), where the noise removal algorithm according to an embodiment of the present disclosure is applied, is far less than an amplitude D1 of noise in a case (FIG. 24) where the noise removal algorithm according to an embodiment of the present disclosure is not applied.

With reference to FIGS. 25 and 27, in a frequency band of about 1,000 Hz to about 5,000 Hz, it can be seen that a magnitude of noise in a case (FIG. 27), where the noise removal algorithm according to an embodiment of the present disclosure is applied, is far less than a magnitude of noise in a case (FIG. 25) where the noise removal algorithm according to an embodiment of the present disclosure is not applied.

With reference to FIGS. 24 to 27, when a sound is provided by applying the noise removal algorithm according to an embodiment of the present disclosure, a sound which is less affected by noise can be provided.

Figure 28:
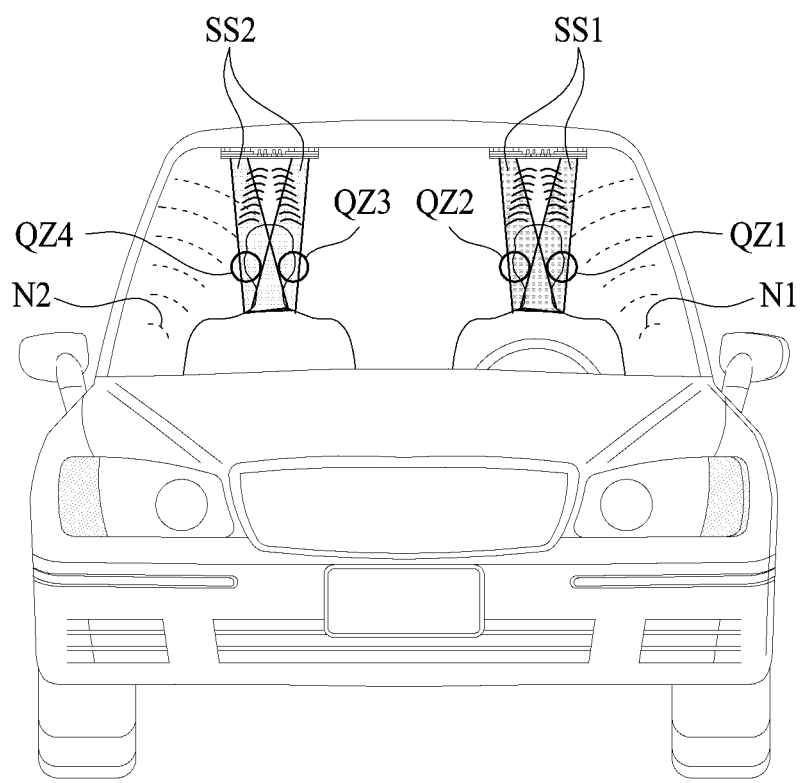
FIG. 28 illustrates a vehicle to which a sound control system for vehicles according to an embodiment of the present disclosure is applied.

FIG. 28 illustrates a vehicle to which a sound control system for vehicles according to an embodiment of the present disclosure is applied.

With reference to FIG. 28, the sound control system for vehicles according to an embodiment of the present disclosure can provide sounds S1 and S2 including a noise removal signal to sound spaces SS1 and SS2, respectively, based on ANC control, and thus, noises N1 and N2 of the sound spaces SS1 and SS2, respectively can be removed. Accordingly, a plurality of quiet or silent zones QZ1 to QZ4 can be implemented near ears of a user in the sound spaces SS1 and SS2 of a vehicle.

With reference to FIGS. 19 and 28, the microphones 221a and 221b of each of the first and second microphone arrays 220a and 220b, respectively, of each of the first and second sound generating devices 200-1 and 200-2, respectively, can provide the first and second noises of the first and second sound spaces SS1 and SS2 to the noise processing circuit 320, and the noise processing circuit 320 can generate first and second noise removal signals, respectively, for removing the first and second noises, respectively, and can provide the first and second noise removal signals to the sound processing circuit 310. The sound processing circuit 310 can generate the first and second vibration driving signals based on the first and second noise removal signals and the sound source signal and can provide the first and second vibration driving signals to the vibration generators 210a-1, 210a-2, 210b-1, and 210b-2 of the first and second sound generating devices 200-1 and 200-2 so that the vibration generators 210a-1, 210a-2, 210b-1, and 210b-2 vibrate, thereby providing the sounds S1 and S2 to the sound spaces SS1 and SS2, respectively.

According to an embodiment of the present disclosure, the microphones 221c and 221d of each of the third and fourth microphone arrays 220c and 220d of each of the third and fourth sound generating devices 200-3 and 200-4 can provide the third and fourth noises of the third and fourth sound spaces SS3 and SS4, respectively, to the noise processing circuit 320, and the noise processing circuit 320 can generate third and fourth noise removal signals for removing third and fourth noises and can provide the third and fourth noise removal signals to the sound processing circuit 310. The sound processing circuit 310 can generate the third and fourth vibration driving signals based on the third and fourth noise removal signals and the sound source signal and can provide the third and fourth vibration driving signals to the vibration generators 210c-1, 210c-2, 210d-1, and 210d-2 of the third and fourth sound generating devices 200-3 and 200-4 so that the vibration generators 210c-1, 210c-2, 210d-1, and 210d-2 vibrate, thereby providing the sounds S3 and S4, respectively, to the sound spaces SS3 and SS4, respectively.

The sound control system for vehicles according to an embodiment of the present disclosure can provide sounds S1 to S4 including a noise removal signal to sound spaces SS1 to SS4 based on ANC control, and thus, noises of the sound spaces SS1 to SS4 can be removed. Accordingly, a plurality of quiet or silent zones can be implemented near ears of a user in the sound spaces SS1 to SS4 of a vehicle.

Figure 29:
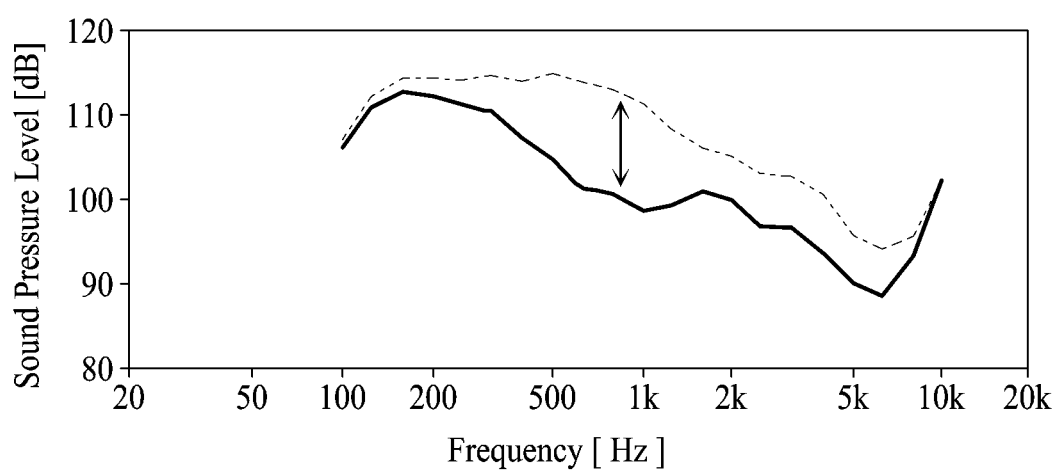
FIG. 29 is a graph showing a sound pressure level characteristic of noise received for each microphone of a sound control system for vehicles according to an embodiment of the present disclosure.

FIG. 29 is a graph illustrating a sound pressure level characteristic of noise received for each microphone of a sound control system for vehicles according to an embodiment of the present disclosure. In FIG. 29, the abscissa axis represents a frequency (Hz), and the ordinate axis represents a sound pressure level (dB). In FIG. 29, a solid line represents a sound pressure level characteristic of noise received by a first microphone, and a dotted line represents a sound pressure level characteristic of noise received by a second microphone at a position which differs from a position of the first microphone.

With reference to FIG. 29, it can be seen that sound pressure levels of noises received by the first and second microphones at different positions differ. As described above, according to an embodiment of the present disclosure, the sound control system for vehicles can receive noise having a sound pressure level which differs for each microphone and can independently provide a sound space with a sound including a noise removal signal for the noise received for each microphone. For example, sounds having different sound pressure levels in a bright space and a dark space in a vehicle can be provided.

A sound control system, a vehicle including the same, and a sound control method according to an embodiment of the present disclosure will be described below.

A sound control system according to some embodiments of the present disclosure can comprise a sound generating device disposed at a vehicle ceiling corresponding to a seat region of the vehicle and disposed at a sound space formed within to the vehicle correspond to the seat region, and a sound processing circuit configured to provide a vibration driving signal to the sound generating device, the sound generating device can be configured to vibrate based on the vibration driving signal to vibrate a vibration region of the vehicle ceiling corresponding to the sound space to provide a sound to the sound space.

According to some embodiments of the present disclosure, the sound generating device can comprise at least one vibration generator including at least one or more vibration devices configured to vibrate based on the vibration driving signal.

According to some embodiments of the present disclosure, the sound generating device can further comprise a microphone array disposed adjacent to the at least one vibration generator, the microphone array including a plurality of microphones.

According to some embodiments of the present disclosure, the sound generating device can comprise two vibration generators, and the microphone array can be disposed between the two vibration generators.

According to some embodiments of the present disclosure, the at least one vibration generator can comprise two vibration generators, and the microphone array can be disposed between the two vibration generators.

According to some embodiments of the present disclosure, each of the at least one or more vibration devices can comprise a vibration portion including a plurality of first portions including an inorganic material and a plurality of second portions including an organic material disposed between the plurality of first portions, a first electrode layer disposed at a first surface of the vibration portion, and a second electrode layer disposed at a second surface of the vibration portion opposite to the first surface of the vibration portion.

According to some embodiments of the present disclosure, each of the at least one vibration device can comprise a vibration portion including a piezoelectric material, a composite piezoelectric material, or an electroactive material, a first electrode layer disposed at a first surface of the vibration portion, and a second electrode layer disposed at a second surface of the vibration portion opposite to the first surface of the vibration portion.

According to some embodiments of the present disclosure, each vibration generator can further comprise a vibration transfer member disposed at a front surface of the at least one vibration device.

According to some embodiments of the present disclosure, each vibration generator can further comprise a plate disposed at a front surface the at least one vibration device or a rear surface of the at least one vibration device.

According to some embodiments of the present disclosure, the plate can be configured to reinforce a mass of the at least one vibration device.

According to some embodiments of the present disclosure, the at least one vibration generator can further comprise a plate disposed at a front surface of the vibration device, and a vibration transfer member disposed at a front surface of the plate.

According to some embodiments of the present disclosure, the sound generating device can be disposed between an interior material and a frame of the vehicle ceiling, and the vibration transfer member can be connected to a rear surface of the frame of the vehicle ceiling.

According to some embodiments of the present disclosure, the at least one vibration generator can comprise a plurality of vibration devices, and the plate can be disposed at the plurality of vibration devices in common, or can be disposed at each of the plurality of vibration devices.

According to some embodiments of the present disclosure, the at least one vibration generator can comprise a plurality of vibration devices, and the plate can be disposed at the plurality of vibration devices.

According to some embodiments of the present disclosure, the sound generating device can be disposed between an interior material of the vehicle and a frame of the vehicle ceiling, and the interior material can comprise a hole formed in a region corresponding to the plurality of microphones.

According to some embodiments of the present disclosure, the sound control system for vehicles can further comprise a beamforming control device configured to perform beamforming control on the plurality of microphones of the microphone array.

According to some embodiments of the present disclosure, the sound generating device can further comprise a frame covering the at least one vibration generator and the microphone array.

According to some embodiments of the present disclosure, the frame can comprise a first frame portion disposed at a front surface of the at least one vibration generator to cover a front periphery and a side surface of the at least one vibration generator, and a second frame portion disposed at a front surface of the microphone array to cover the front surface of the microphone array.

According to some embodiments of the present disclosure, the second frame portion can comprise a groove corresponding to the plurality of microphones of the microphone array.

According to some embodiments of the present disclosure, the first frame portion can be configured in one or more shapes of a corner-rounded tetragonal shape, a circular shape, and an oval shape.

According to some embodiments of the present disclosure, the at least one vibration device can have the same shape as a shape of the first frame portion.

According to some embodiments of the present disclosure, the at least one vibration generator can comprise a plurality of vibration devices, and each of the plurality of vibration devices can have the same shape as a shape of the first frame portion.

According to some embodiments of the present disclosure, the first frame portion can be formed in a corner-rounded tetragonal shape, the at least one vibration generator can comprise a plurality of vibration devices, and each of the plurality of vibration devices can be formed in a tetragonal shape where a corner of each of the plurality of vibration devices corresponds to a corner of the first frame.

According to some embodiments of the present disclosure, the sound control system for vehicles can further comprise a noise processing circuit configured to receive a noise signal from the plurality of microphones of the microphone array to generate a noise removal signal having a phase opposite to a phase of the noise signal, the sound processing circuit can be configured to receive the noise removal signal from the noise processing circuit and can generate the vibration driving signal based on a sound source signal and the noise removal signal.

According to some embodiments of the present disclosure, the seat region of the vehicle can comprise first to fourth seat regions, the sound generating device can be disposed at each of first to fourth vibration regions of the vehicle ceiling to correspond to each of the first to fourth seat regions, the sound processing circuit can be configured to provide the vibration driving signal to at least one or more of a plurality of sound generating devices respectively disposed at the first to fourth seat regions, and the at least one or more sound generating devices can be configured to vibrate based on the vibration driving signal to vibrate a corresponding vibration region to provide a sound to the sound space.

According to some embodiments of the present disclosure, the sound generating device can comprise first to fourth sound generating devices respectively disposed at the first to fourth vibration regions, the sound processing circuit can be configured to provide first to fourth vibration driving signals to the first to fourth sound generating devices, and each of the first to fourth sound generating devices can be configured to vibrate based on a corresponding vibration driving signal of the first to fourth vibration driving signals to vibrate a corresponding vibration region of the first to fourth vibration regions to provide a corresponding sound of first to fourth sounds to a corresponding sound space of first to fourth sound spaces.

According to some embodiments of the present disclosure, the seat region can be a first seat region among a plurality of seat regions of the vehicle and the vibration region can be a first vibration region among a plurality of vibration regions, each seat region including a corresponding vibration region, the sound generating device can be a first sound generating device among a plurality of sound generating devices, each sound generating device being disposed at a respective one of the plurality of vibration regions, the sound processing circuit can be configured to provide the vibration driving signal to each sound generating device, and each sound generating device can be configured to vibrate based on the vibration driving signal to vibrate a corresponding vibration region to provide a sound to a corresponding sound space.

A vehicle according to some embodiments of the present disclosure can comprise a ceiling, an enclosure disposed at the ceiling and at a position corresponding to a seat region of the vehicle to form a sound space, and a sound control system configured to provide a sound to the sound space, the sound control system can comprising a sound generating device disposed within the enclosure, and a sound processing circuit configured to provide a vibration driving signal to the sound generating device to cause the sound generating device to vibrate a vibration region of the vehicle ceiling corresponding to the sound space to provide a sound to the sound space.

According to some embodiments of the present disclosure, the enclosure can comprise at least one or more bent portions, and the at least one or more bent portions can face an inner portion of the enclosure or an outer portion of the enclosure.

According to some embodiments of the present disclosure, the at least one or more bent portions can face the sound generating device disposed at the enclosure and may be toward the sound generating device or may be toward an opposite direction of the sound generating device.

According to some embodiments of the present disclosure, the at least one or more bent portions can face the sound generating device disposed at the enclosure or may face toward an opposite direction of the sound generating device.

According to some embodiments of the present disclosure, the sound generating device can comprise a vibration generator including at least one vibration device configured to vibrate based on the vibration driving signal, and the at least one or more bent portions can face the vibration generator and may be toward the vibration generator or are toward an opposite direction of the vibration generator.

According to some embodiments of the present disclosure, the sound generating device can comprise a vibration generator including at least one vibration device configured to vibrate based on the vibration driving signal, and the at least one or more bent portions can face the vibration generator or face away from the vibration generator.

According to some embodiments of the present disclosure, the sound generating device can further comprise a microphone array disposed adjacent to the vibration generator, the microphone array including a plurality of microphones, and the at least one or more bent portions can face the microphone array and may be toward the microphone array or may be toward an opposite direction of the microphone array.

According to some embodiments of the present disclosure, the sound generating device can further comprise a microphone array disposed adjacent to the vibration generator, the microphone array including a plurality of microphones, and the at least one or more bent portions can face the microphone array or can face away from the microphone array.

According to some embodiments of the present disclosure, the enclosure can comprise at least one or more pair of bent portions facing one another, and the at least one or more pair of bent portions may face toward an inner portion of the enclosure or an outer portion of the enclosure.

According to some embodiments of the present disclosure, the at least one or more pair of bent portions can face the sound generating device disposed at the enclosure and may be toward the sound generating device or may be toward an opposite direction of the sound generating device.

According to some embodiments of the present disclosure, the at least one or more pair of bent portions may face the sound generating device disposed at the enclosure or may face away from the sound generating device.

According to some embodiments of the present disclosure, the sound generating device can comprise at least one vibration generator including at least one or more vibration devices vibrating based on the vibration driving signal, and the at least one or more pair of bent portions can face one another with the at least one vibration generator therebetween and may be toward the vibration generator or may be toward an opposite direction of the at least one vibration generator.

According to some embodiments of the present disclosure, the sound generating device can comprise at least one vibration generator including at least one or more vibration devices vibrating based on the vibration driving signal, and the at least one or more pair of bent portions can face one another with the at least one vibration generator therebetween and can face away from the at least one vibration generator.

According to some embodiments of the present disclosure, the sound generating device can further comprise a microphone array disposed adjacent to the at least one vibration generator, the microphone array including a plurality of microphones, and the at least one or more pair of bent portions can face the microphone array and may be toward the microphone array or may be toward an opposite direction of the microphone array.

According to some embodiments of the present disclosure, the sound generating device can further comprise a microphone array disposed adjacent to the at least one vibration generator, the microphone array including a plurality of microphones, and the at least one or more pair of bent portions can face the microphone array or can face away from the microphone array.

According to some embodiments of the present disclosure, the enclosure can comprise a vibration absorption member disposed at the vehicle ceiling.

According to some embodiments of the present disclosure, the enclosure can comprise at least one or more of a first vibration absorption layer including a first material and a second vibration absorption layer including a second material.

According to some embodiments of the present disclosure, the vibration absorption member can comprise a first vibration absorption layer including a first material and a second vibration absorption layer including a second material. The second material can be different from the first material.

According to some embodiments of the present disclosure, the first vibration absorption layer can be disposed at the vehicle ceiling and the second vibration absorption layer can be disposed at a rear surface of the first vibration absorption layer, or the second vibration absorption layer can be disposed at the vehicle ceiling and the first vibration absorption layer can be disposed at a rear surface of the second vibration absorption layer.

According to some embodiments of the present disclosure, the enclosure can further comprise an air gap at a center of a width of the vibration absorption member.

According to some embodiments of the present disclosure, the enclosure can comprise a first vibration absorption layer disposed at one side of the air gap and a second vibration absorption layer disposed at the other side of the air gap, with respect to the width of the vibration absorption member.

According to some embodiments of the present disclosure, the enclosure can comprise a first vibration absorption layer disposed at a first side of the air gap and a second vibration absorption layer disposed at a second of the air gap opposite to the first side of the air gap with respect to the width of the vibration absorption member.

According to some embodiments of the present disclosure, the sound control system can be the sound control system.

A sound control method for vehicles according to some embodiments of the present disclosure can comprise generating a vibration driving signal based on a supplied sound source signal, and vibrating a sound generating device, disposed at a vehicle ceiling corresponding to a seat region of the vehicle and disposed at a sound space formed within a vehicle to correspond to the seat region, based on the vibration driving signal to vibrate a vibration region of the vehicle ceiling corresponding to the sound space to provide a sound to the sound space.

A sound control method for vehicles according to some embodiments of the present disclosure can comprise generating a vibration driving signal based on a supplied sound source signal, and vibrating a sound generating device, based on the vibration driving signal, to vibrate a vibration region of a vehicle corresponding to a sound space of the vehicle to provide a sound to the sound space.

According to some embodiments of the present disclosure, the seat region of the vehicle can comprise first to fourth seat regions, the sound generating device can be disposed at each of first to fourth vibration regions of the vehicle ceiling to correspond to each of the first to fourth seat regions, and the providing the sound to the sound space can comprise providing the vibration driving signal to at least one or more of a plurality of sound generating devices disposed at each of the first to fourth seat regions, and vibrating a corresponding vibration region by using the at least one or more sound generating devices so that the at least one or more sound generating devices vibrate based on the vibration driving signal, thereby providing a sound to the sound space.

According to some embodiments of the present disclosure, the sound generating device can be disposed at a vehicle ceiling corresponding to a seat region of the vehicle and can be disposed at the sound space corresponding to the seat region, the seat region can be a first seat region among a plurality of seat regions of the vehicle, the vibration region can be a first vibration region among a plurality of vibration regions, the sound generating device can be a first sound generating device among a plurality of sound generating devices, each sound generating device being disposed at a respective one of the vibration regions, and the providing the sound to the sound space can comprise providing the vibration driving signal to at least one of the plurality of sound generating devices, and vibrating a corresponding vibration region by using the at least one sound generating device so that the at least one sound generating device vibrates based on the vibration driving signal, thereby providing a sound to a corresponding sound space.

According to some embodiments of the present disclosure, the sound generating device can comprise first to fourth sound generating devices disposed at each of the first to fourth vibration regions, and the providing the sound to the sound space can comprise respectively providing first to fourth vibration driving signals to the first to fourth sound generating devices to vibrate each of the first to fourth sound generating devices based on a corresponding vibration driving signal of the first to fourth vibration driving signals to vibrate a corresponding vibration region of the first to fourth vibration regions to provide a corresponding sound of first to fourth sounds to a corresponding sound space of first to fourth sound spaces.

According to some embodiments of the present disclosure, the providing the sound to the sound space can comprise providing the vibration driving signal to each sound generating device to vibrate each vibration region and thereby provide a sound to each sound space.

According to some embodiments of the present disclosure, the sound control method can further comprise generating a noise removal signal having a phase opposite to a phase of a noise signal corresponding to noise in the sound space, the generating of the vibration driving signal can be based on the sound source signal and the noise removal signal.

According to some embodiments of the present disclosure, the generating of the noise removal signal can comprise generating a plurality of noise removal signals for a plurality of noise signals from each of a plurality of sound generating devices, each sound generating device being disposed at a respective one of a plurality of seat regions.

According to some embodiments of the present disclosure, the sound control method can further comprise measuring noise in the sound space, and performing beamforming control on a plurality of microphones of a microphone array of the sound generating device, based on the measurement result of the noise in the sound space.

According to some embodiments of the present disclosure, the sound generating device can comprise first to fourth sound generating devices disposed at each of the first to fourth vibration regions, and the performing of the beamforming control can comprise performing beamforming control on a plurality of microphones of a microphone array of each of the first to fourth sound generating device.

According to some embodiments of the present disclosure, the sound generating device can comprise a first sound generating device, a second sound generating device, a third sound generating device and a fourth sound generating device, each of the first, second, third and fourth sound generating devices disposed at a respective one of a first vibration region, a second vibration region, a third vibration region and a fourth vibration region, and the performing of the beamforming control comprises performing beamforming control on a plurality of microphones of a microphone array of each of the first, second, third and fourth sound generating devices.

A sound control system according to some embodiments of the present disclosure can comprise a sound generating device assembly disposed within a vehicle interior and including a plurality of sound generating devices, each sound generating device being disposed within a respective sound space of the vehicle interior, and a sound processing circuit configured to provide a vibration driving signal to the sound generating device assembly to cause each sound generating device to provide a sound to the respective sound space.

It will be apparent to those skilled in the art that various modifications and variations can be made in the present disclosure without departing from the technical idea or scope of the disclosures. Thus, it is intended that embodiments of the present disclosure cover the modifications and variations of the disclosure provided they come within the scope of the appended claims and their equivalents.

What is claimed is:

1. A sound control system, comprising:
   a sound generating device disposed at a vehicle ceiling corresponding to a seat region of the vehicle and disposed at a sound space formed within the vehicle to correspond to the seat region; and
   a sound processing circuit configured to provide a vibration driving signal to the sound generating device,
   wherein the sound generating device is configured to vibrate based on the vibration driving signal to vibrate a vibration region of the vehicle ceiling corresponding to the sound space to provide a sound to the sound space, and
   wherein the sound generating device overlaps and is attached to the vibration region of the vehicle ceiling to directly vibrate the vibration region of the vehicle ceiling to provide the sound.

2. The sound control system of claim 1, wherein the sound generating device comprises at least one vibration generator including at least one vibration device configured to vibrate based on the vibration driving signal.

3. The sound control system of claim 2, wherein the sound generating device further comprises a microphone array disposed adjacent to the at least one vibration generator, the microphone array including a plurality of microphones.

4. The sound control system of claim 3, wherein the at least one vibration generator includes two vibration generators, and
   wherein the microphone array is disposed between the two vibration generators.

5. The sound control system of claim 2, wherein each vibration device comprises:
   a vibration portion including a piezoelectric material, a composite piezoelectric material, or an electroactive material;
   a first electrode layer disposed at a first surface of the vibration portion; and
   a second electrode layer disposed at a second surface of the vibration portion opposite to the first surface of the vibration portion.

6. The sound control system of claim 2, wherein each vibration generator further comprises a vibration transfer member disposed at a front surface of the at least one vibration device or a rear surface of the vibration device, or
   wherein each vibration generator further comprises a plate disposed at the front surface of the at least one vibration device or the rear surface of the at least one vibration device.

7. The sound control system of claim 6, wherein the plate is configured to reinforce a mass of the at least one vibration device.

8. The sound control system of claim 7,
   wherein the at least one vibration generator comprises a plurality of vibration devices, and
   wherein the plate is disposed at the plurality of vibration devices.

9. The sound control system of claim 3,
   wherein the sound generating device is disposed between an interior material of the vehicle and a frame of the vehicle ceiling, and
   wherein the interior material comprises a hole formed in a region corresponding to the plurality of microphones.

10. The sound control system of claim 3, further comprising a beamforming control device configured to perform beamforming control on the plurality of microphones of the microphone array.

11. The sound control system of claim 3, wherein the sound generating device further comprises a frame covering the at least one vibration generator and the microphone array.

12. The sound control system of claim 11, wherein the frame comprises:
    a first frame portion disposed at a front surface of the at least one vibration generator to cover a front periphery and a side surface of the at least one vibration generator; and
    a second frame portion disposed at a front surface of the microphone array to cover the front surface of the microphone array.

13. The sound control system of claim 12, wherein the second frame portion comprises a groove corresponding to the plurality of microphones of the microphone array, or
    wherein the first frame portion is configured in one or more shapes of a corner-rounded tetragonal shape, a circular shape, and an oval shape, or
    wherein the at least one vibration device has a same shape as a shape of the first frame portion.

14. The sound control system of claim 13, wherein:
    the first frame portion is formed in a corner-rounded tetragonal shape, the at least one vibration generator comprises a plurality of vibration devices, and each of the plurality of vibration devices is formed in a tetragonal shape where a corner of each of the plurality of vibration devices corresponds to a corner of the first frame portion.

15. The sound control system of claim 3, further comprising a noise processing circuit configured to receive a noise signal from the plurality of microphones of the microphone array to generate a noise removal signal having a phase opposite to a phase of the noise signal, wherein the sound processing circuit is configured to receive the noise removal signal from the noise processing circuit and generating the vibration driving signal based on a sound source signal and the noise removal signal.

16. The sound control system of claim 1, wherein:

the seat region is a first seat region among a plurality of seat regions of the vehicle and the vibration region is a first vibration region among a plurality of vibration regions, each seat region including a corresponding vibration region, the sound generating device is a first sound generating device among a plurality of sound generating devices, each sound generating device being disposed at a respective one of the plurality of vibration regions, the sound processing circuit is configured to provide the vibration driving signal to each sound generating device, and each sound generating device is configured to vibrate based on the vibration driving signal to vibrate a corresponding vibration region to provide a sound to a corresponding sound space.

17. A vehicle, comprising:

a ceiling;

an enclosure disposed at the ceiling and at a position corresponding to a seat region of the vehicle to form a sound space; and a sound control system configured to provide a sound to the sound space, the sound control system including:
 a sound generating device disposed within the enclosure; and
 a sound processing circuit configured to provide a vibration driving signal to the sound generating device to cause the sound generating device to vibrate a vibration region of the vehicle ceiling corresponding to the sound space to provide a sound to the sound space, wherein the sound generating device overlaps and is attached to the vehicle ceiling to directly vibrate the vibration region of the vehicle ceiling to provide the sound.

18. The vehicle of claim 17, wherein the enclosure comprises a plurality of bent portions, and wherein the plurality of bent portions face an inner portion of the enclosure or an outer portion of the enclosure, or wherein the plurality of bent portions face the sound generating device disposed at the enclosure or face toward an opposite direction of the sound generating device.

19. The vehicle of claim 18, wherein the sound generating device comprises a vibration generator, the vibration generator including at least one vibration device configured to vibrate based on the vibration driving signal, and wherein the face the vibration generator or faces away from the vibration generator.

20. The vehicle of claim 19, wherein the sound generating device further comprises a microphone array disposed adjacent to the vibration generator, the microphone array including a plurality of microphones, and wherein the plurality of bent portions face the microphone array or faces away from the microphone array.

21. The vehicle of claim 17, wherein the enclosure comprises a vibration absorption member disposed at the vehicle ceiling.

22. The vehicle of claim 21, wherein the vibration absorption member includes a first vibration absorption layer including a first material and a second vibration absorption layer including a second material different from the first material, and wherein the first vibration absorption layer is disposed at the vehicle ceiling and the second vibration absorption layer is disposed at a rear surface of the first vibration absorption layer, or wherein the second vibration absorption layer is disposed at the vehicle ceiling and the first vibration absorption layer is disposed at a rear surface of the second vibration absorption layer.

23. The vehicle of claim 22, wherein the enclosure further comprises an air gap at a center of a width of the vibration absorption member, wherein the first vibration absorption layer is disposed at a first side of the air gap, and wherein the second vibration absorption layer is disposed at a second side of the air gap opposite to the first side of the air gap with respect to the width of the vibration absorption member.

24. A sound control method, the sound control method comprising:

generating a vibration driving signal based on a supplied sound source signal; and vibrating a sound generating device, based on the vibration driving signal, to vibrate a vibration region of a vehicle corresponding to a sound space of the vehicle to provide a sound to the sound space, wherein the sound generating device overlaps and is attached to the vehicle to directly vibrate the vibration region of the vehicle to provide the sound.

25. The sound control method of claim 24, wherein the sound generating device is disposed at a vehicle ceiling corresponding to a seat region of the vehicle and is disposed at the sound space corresponding to the seat region, wherein the seat region is a first seat region among a plurality of seat regions of the vehicle, wherein the vibration region is a first vibration region among a plurality of vibration regions, wherein the sound generating device is a first sound generating device among a plurality of sound generating devices, each sound generating device being disposed at a respective one of the vibration regions, and wherein the providing the sound to the sound space comprises providing the vibration driving signal to at least one of the plurality of sound generating devices, and vibrating a corresponding vibration region by using the at least one sound generating device so that the at least one sound generating device vibrates based on the vibration driving signal, thereby providing a sound to a corresponding sound space.

26. The sound control method of claim 25,
wherein the providing the sound to the sound space comprises providing the vibration driving signal to each sound generating device to vibrate each vibration region and thereby provide a sound to each sound space.

27. The sound control method of claim 24, further comprising generating a noise removal signal having a phase opposite to a phase of a noise signal corresponding to noise in the sound space,
wherein the generating of the vibration driving signal is based on the sound source signal and the noise removal signal.

28. The sound control method of claim 27, wherein the generating of the noise removal signal comprises generating a plurality of noise removal signals for a plurality of noise signals from each of a plurality of sound generating devices, each sound generating device being disposed at a respective one of a plurality of seat regions.

29. The sound control method of claim 24, further comprising:
measuring noise in the sound space; and
performing beamforming control on a plurality of microphones of a microphone array of the sound generating device, based on the measurement result of the noise in the sound space.

30. The sound control method of claim 29,
wherein the sound generating device comprises a first sound generating device, a second sound generating device, a third sound generating device and a fourth sound generating device, each of the first, second, third and fourth sound generating devices disposed at a respective one of a first vibration region, a second vibration region, a third vibration region and a fourth vibration region, and
wherein the performing of the beamforming control comprises performing beamforming control on a plurality of microphones of a microphone array of each of the first, second, third and fourth sound generating devices.

31. A sound control system, comprising:
a sound generating device assembly disposed within a vehicle interior and including a plurality of sound generating devices, each sound generating device being disposed within a respective sound space of the vehicle interior; and
a sound processing circuit configured to provide a vibration driving signal to the sound generating device assembly to cause each sound generating device to provide a sound to the respective sound space,
wherein the sound generating device overlaps and is attached to the vehicle interior to directly vibrate the vehicle interior to provide the sound.

32. The sound control system of claim 31, wherein each sound generating device comprises at least one vibration generator including at least one vibration device configured to vibrate based on the vibration driving signal.

33. The sound control system of claim 32, wherein each sound generating device further comprises a microphone array disposed adjacent to the at least one vibration generator, the microphone array including a plurality of microphones.

34. The sound control system of claim 33, wherein the at least one vibration generator includes two vibration generators, and
wherein the microphone array is disposed between the two vibration generators.

35. The sound control system of claim 32, wherein each vibration device comprises:
a vibration portion including a piezoelectric material, a composite piezoelectric material, or an electroactive material;
a first electrode layer disposed at a first surface of the vibration portion; and
a second electrode layer disposed at a second surface of the vibration portion opposite to the first surface of the vibration portion.

36. The sound control system of claim 32, wherein each vibration generator further comprises a vibration transfer member disposed at a front surface of the at least one vibration device or a rear surface of the at least one vibration device, or
wherein each vibration generator further comprises a plate disposed at the front surface of the at least one vibration device or the rear surface of the at least one vibration device.

37. The sound control system of claim 36, wherein the plate is configured to reinforce a mass of the at least one vibration device.

38. The sound control system of claim 37, wherein the at least one vibration generator comprises a plurality of vibration devices, and
wherein the plate is disposed at the plurality of vibration devices.

39. The sound control system of claim 33, wherein the sound generating device is disposed between an interior material of the vehicle and a frame of the vehicle ceiling, and
wherein the interior material comprises a hole formed in a region corresponding to the plurality of microphones.

40. The sound control system of claim 33, further comprising a beamforming control device configured to perform beamforming control on the plurality of microphones of the microphone array.

41. The sound control system of claim 33, wherein the sound generating device further comprises a frame covering the at least one vibration generator and the microphone array.

42. The sound control system of claim 41, wherein the frame comprises:
a first frame portion disposed at a front surface of the at least one vibration generator to cover a front periphery and a side surface of the at least one vibration generator; and
a second frame portion disposed at a front surface of the microphone array to cover the front surface of the microphone array.

43. The sound control system of claim 42, wherein the second frame portion comprises a groove corresponding to the plurality of microphones of the microphone array, or
wherein the first frame portion is configured in one or more shapes of a corner-rounded tetragonal shape, a circular shape, and an oval shape, or
wherein the at least one vibration device has a same shape as a shape of the first frame portion.

44. The sound control system of claim 43, wherein:
the first frame portion is formed in a corner-rounded tetragonal shape,
the at least one vibration generator comprises a plurality of vibration devices, and
each of the plurality of vibration devices is formed in a tetragonal shape where a corner of each of the plurality of vibration devices corresponds to a corner of the first frame portion.

45. The sound control system of claim 33, further comprising a noise processing circuit configured to receive a noise signal from the plurality of microphones of the microphone array to generate a noise removal signal having a phase opposite to a phase of the noise signal,
- wherein the sound processing circuit is configured to receive the noise removal signal from the noise processing circuit and generating the vibration driving signal based on a sound source signal and the noise removal signal.

46. The sound control system of claim 31, wherein:
- the sound generating device is disposed at a vibration region of a vehicle ceiling corresponding to a seat region of a vehicle and is disposed at the sound space corresponding to the seat region,
- the seat region is a first seat region among a plurality of seat regions of the vehicle and the vibration region is a first vibration region among a plurality of vibration regions, each seat region including a corresponding vibration region,
- the sound generating device is a first sound generating device among the plurality of sound generating devices, each sound generating device being disposed at a respective one of the plurality of vibration regions,
- the sound processing circuit is configured to provide the vibration driving signal to each sound generating device, and
- each sound generating device is configured to vibrate based on the vibration driving signal to vibrate a corresponding vibration region to provide a sound to a corresponding sound space.

* * * * *